United States Patent
Broadhurst et al.

(10) Patent No.: US 10,510,182 B2
(45) Date of Patent: Dec. 17, 2019

(54) USING TILING DEPTH INFORMATION IN HIDDEN SURFACE REMOVAL IN A GRAPHICS PROCESSING SYSTEM

(71) Applicant: Imagination Technologies Limited, Kings Langley (GB)

(72) Inventors: Richard Broadhurst, Chipperfield (GB); John Howson, St. Albans (GB); Robert Theed, Langport (GB)

(73) Assignee: Imagination Technologies Limited, Kings Langley (GB)

( * ) Notice: Subject to any disclaimer, the term of this patent is extended or adjusted under 35 U.S.C. 154(b) by 620 days.

(21) Appl. No.: 14/875,873

(22) Filed: Oct. 6, 2015

(65) Prior Publication Data

US 2016/0098856 A1 Apr. 7, 2016

(30) Foreign Application Priority Data

Oct. 6, 2014 (GB) .................................. 1417610.1

(51) Int. Cl.
*G06T 15/40* (2011.01)
*G06T 15/00* (2011.01)

(52) U.S. Cl.
CPC .......... *G06T 15/405* (2013.01); *G06T 15/005* (2013.01)

(58) Field of Classification Search
CPC ................ G06T 15/005; G06T 15/40–405
See application file for complete search history.

(56) References Cited

U.S. PATENT DOCUMENTS

| 2007/0146378 A1* | 6/2007 | Sorgard ................. G06T 15/00 345/581 |
| 2010/0231588 A1* | 9/2010 | Barczak ................ G06T 15/405 345/422 |
| 2014/0168220 A1 | 6/2014 | Nystad et al. |
| 2015/0097831 A1* | 4/2015 | Doffinger .............. G06T 15/405 345/422 |

* cited by examiner

*Primary Examiner* — Charles Tseng
(74) *Attorney, Agent, or Firm* — Vorys, Sater, Seymour and Pease LLP; Vincent M DeLuca

(57) ABSTRACT

A graphics processing system includes a tiling unit for performing tiling calculations and a hidden surface removal (HSR) unit for performing HSR on fragments of the primitives. Primitive depth information is calculated in the tiling unit and forwarded for use by the HSR unit in performing HSR on the fragments. This takes advantage of the tiling unit having access to the primitive data before the HSR unit performs the HSR on the primitive fragments, to determine some depth information which can simplify the HSR performed by the HSR unit. Therefore, the final values of a depth buffer determined in the tiling unit can be used in the HSR unit to determine that a particular fragment will be subsequently hidden by a fragment of a primitive which is yet to be processed in the HSR unit, such that the particular fragment can be culled.

20 Claims, 12 Drawing Sheets

USING TILING DEPTH INFORMATION IN HIDDEN SURFACE REMOVAL IN A GRAPHICS PROCESSING SYSTEM

BACKGROUND

Graphics processing systems can be configured to receive graphics data, e.g. from an application such as a game, and to process the graphics data in order to generate an image representing a view of a three dimensional (3D) scene. The graphics data may comprise data defining primitives (e.g. the location and appearance of the primitives) which form objects in the 3D scene. Typical operations performed by a graphics processing system include: (i) texturing and/or shading the primitives according to the data defining the primitives, and (ii) determining which parts of the primitives are visible from the viewpoint that the scene is being rendered from, and removing surfaces which are determined not to be visible (which is known in the art as "hidden surface removal" or HSR). Some graphics processing systems (e.g. immediate mode rendering systems) perform the texturing and/or shading operations before the hidden surface removal operations. However, to avoid the processing cost of unnecessarily texturing and shading surfaces which are not visible in the final rendered image, some other graphics processing systems (e.g. deferred rendering systems) perform the hidden surface removal operations before the texturing and/or shading operations.

The HSR and texturing/shading operations are performed by a graphics processing system on-chip and typically involve reading large quantities of primitive data from an off-chip memory, and writing rendered pixel data back to that memory. The rendering process may generate large quantities of intermediate data such as depth data and fragment data which may also need to be stored. Passing data between the off-chip memory and the on-chip graphics processing system may incur delays and use significant amounts of power, so it can be beneficial to store some of the data on-chip whilst the graphics processing system acts on the primitive data. Typically, there will not be enough on-chip memory to store all of the data for rendering a whole image. Therefore, some graphics processing systems have a rendering space which is sub-divided into a plurality of tiles, wherein each tile can be processed separately, such that data for a particular tile can be stored on-chip while the graphics processing systems acts on the primitives that are present within that particular tile. For example, depth data for a tile is stored on-chip while HSR processing is performed for the tile. This helps to reduce the amount of data transferred to and from the off-chip memory, and to reduce latency when the graphics processing system processes the primitive data.

Systems which have a rendering space that is sub-divided into a plurality of tiles may include a tiling unit (which may be referred to as a "tile accelerator," or simply a "TA"). The tiling unit processes the input graphics data (which includes data defining primitives in the 3D scene to be rendered) and performs tiling calculations to thereby determine, for each of the primitives, which of the tiles the primitive is present in. A primitive is determined to be present in a tile if the primitive, when projected into the rendering space, is determined to overlap wholly or partially with the tile.

The tiling unit generates tile control streams for the tiles, whereby the tile control stream for a tile includes indicators of primitives which are present in that tile. For example a tile control stream for a tile may include state information for the tile, and a list of object pointers to indicate the primitives that were determined to be present in the tile. The object pointers may refer to primitive data stored elsewhere, such that a primitive may be referenced by more than one tile's control stream. That is, the primitive data may be stored (e.g. in primitive blocks) separately from the control streams of the tiles, such that the control streams are per-tile, whereas the primitive data does not need to be stored per-tile. Collectively, the control streams and the primitive data may be referred to as a "display list." In other examples the primitive data for the indicated primitives may be included in the control stream. The tile control streams are stored, and subsequently passed to a HSR unit (which may be referred to as an "image synthesis processor," or simply an "ISP") which is configured to perform the hidden surface removal on a tile-by-tile basis on the fragments of the primitives which are present in a tile. The "fragments" of the primitives are the portions of the primitives which overlap with respective sample positions of the final image to be rendered. The "sample positions" represent the discrete positions of the final image at which the graphics processing system operates to determine the appearance of the scene. For example, the sample positions may correspond to the pixel positions of the final image, but in order to provide for greater accuracy in the final image, each pixel position of the final image may be represented by a block of more than one sample position.

As is known in the art, the HSR unit may perform the HSR for the fragments of primitives which are present in a tile using a technique known as "Z-buffering" in which the depth values of each primitive in the tile are calculated at each sample position and are compared with a previously stored depth. The primitives are processed in a sequential manner and, in a simple example in which all of the primitives are opaque, a depth buffer stores, for each sample position, the depth of the closest fragment (i.e. closest to the viewpoint of the scene) which has been processed by the HSR unit, and a tag buffer stores, for each sample position, a tag (i.e. an identifier) of the primitive which has the closest depth at that sample position. When a new primitive is processed in the HSR unit, the depth values of the fragments of the primitive are compared with the depth values in the depth buffer in accordance with a depth compare mode, and in a usual depth compare mode if the fragments of the new primitive are closer than the fragments whose depth values are stored in the depth buffer at the appropriate positions, then the depth values of the fragments of the new primitive are stored in the depth buffer and a tag of the new primitive is stored in the tag buffer, to replace any existing depth and tag values at the appropriate positions. The HSR unit sends the visible surface information to a texturing and shading unit where the fragments are textured and/or shaded before being sent to a frame buffer for display.

The functions of the tiling unit and the HSR unit are different. That is, the tiling unit performs the tiling calculations and the HSR unit performs the depth testing for hidden surface removal. Typically, the tiling unit does not perform depth testing.

The system described above works well for processing opaque primitives. However, some primitives may have an object type allowing for translucency and/or punch through. The translucency or punch through may be represented by the textures to be applied to the fragments of the primitives (e.g. as represented by an alpha value if the texture includes RGBA values—Red, Green, Blue and Alpha values). A punch through primitive includes some "holes" in the sense that not all of the sample positions within the edges of the primitive generate visible fragments. Punch through fragments are created initially for all sample positions within the primitive, and a test (which may be referred to as an "alpha test") indicates whether a fragment should be included in the subsequent processing, or whether it should be discarded, i.e. it is part of a hole in the primitive. For a punch through primitive, the depth buffer is updated and the fragment rendered only for those fragments that pass both the depth and alpha tests. Since, in deferred rendering systems, the texturing of the fragments of the primitives (which determines whether the fragments are punch through fragments) occurs after the hidden surface removal, the HSR unit might not be able to determine which fragments are visible until after the texturing has been applied to the fragments. This may result in a feedback loop from the texturing/shading unit to the HSR unit to indicate the alpha state of the fragments so that the HSR unit can properly update the depth buffer. A feedback loop such as this can reduce the efficiency of the graphics processing system since the HSR unit may process some aspects of the same fragment twice.

Inefficiencies may also occur when processing primitives with an object type that allows translucency and/or punch through, if fragments from those primitives are covered by opaque fragments. If for example, a fragment ("fragment A") which is currently the closest fragment at a particular sample position is subsequently covered by a translucent fragment ("fragment B"), then the tag of fragment A may need to be flushed from the tag buffer. Fragment A is then processed by the texturing/shading unit and the tag for fragment B is stored in the tag buffer. The texturing/shading unit can subsequently perform a blend operation of fragments A and B. However, if fragment B is then covered by an opaque fragment ("fragment C") then both fragments A and B will be hidden in the final image and the processing performed on both of those fragments has been wasted.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a graphics processing system having a rendering space sub-divided into a plurality of tiles, the system being configured to process primitives which are present in one or more of the tiles, the system comprising: a tiling unit configured to process the primitives to: (i) determine, for each of the primitives, which of the tiles the primitive is present in, and (ii) generate tile control streams for the tiles, wherein the tile control stream for a tile includes indicators of primitives which are present in that tile; and a hidden surface removal unit configured to: (i) retrieve data relating to the primitives which are present in a tile as indicated by the generated tile control stream for the tile, and (ii) perform hidden surface removal on fragments of the indicated primitives at sample positions of the tile; wherein the tiling unit is further configured to: determine depth information for the tiles by performing depth tests on fragments of the primitives as they are processed in the tiling unit; and forward the determined depth information for use by the hidden surface removal unit; and wherein the hidden surface removal unit is configured to use the forwarded depth information in performing said hidden surface removal. The hidden surface removal unit may be configured to use the forwarded depth information for a tile in setting values of a HSR depth buffer for use in performing said hidden surface removal for the tile.

There is further provided a method of processing primitives in a graphics processing system having a rendering space sub-divided into a plurality of tiles, the method comprising: processing the primitives at a tiling unit to: (i) determine, for each of the primitives, which of the tiles the primitive is present in, and (ii) generate tile control streams for the tiles, wherein the tile control stream for a tile includes indicators of primitives which are present in that tile; and processing the primitives at a hidden surface removal unit by: (i) retrieving data relating to the primitives which are present in a tile as indicated by the generated tile control stream for the tile, and (ii) performing hidden surface removal on fragments of the indicated primitives at sample positions of the tile; wherein the method further comprises: determining depth information for the tiles at the tiling unit by performing depth tests on fragments of the primitives as they are processed in the tiling unit; forwarding the determined depth information from the tiling unit for use by the hidden surface removal unit; and using the forwarded depth information in performing said hidden surface removal at the hidden surface removal unit.

There is still further provided a graphics processing system configured to process primitives which are present in a rendering space of the system, the system comprising: a first processing unit configured to process the primitives prior to hidden surface removal; and a hidden surface removal unit configured to perform hidden surface removal on fragments of the primitives at sample positions of the rendering space; wherein the first processing unit is further configured to: determine depth information for the primitives by performing depth tests on fragments of the primitives; and forward the determined depth information for use by the hidden surface removal unit; and wherein the hidden surface removal unit is configured to use the forwarded depth information in performing said hidden surface removal.

There is still further provided a method of processing primitives in a graphics processing system having a rendering space, the method comprising: processing the primitives at a first processing unit prior to hidden surface removal; and processing the primitives at a hidden surface removal unit by performing hidden surface removal on fragments of the primitives at sample positions of the rendering space; wherein the method further comprises: determining depth information for the primitives at the first processing unit by performing depth tests on fragments of the primitives; forwarding the determined depth information from the first processing unit for use by the hidden surface removal unit; and using the forwarded depth information in performing said hidden surface removal at the hidden surface removal unit.

There is further provided non-transitory computer readable code adapted to perform the steps of any of the methods described herein when the code is run on a computer. There may be provided non-transitory computer readable code for generating a graphics processing system according to any of the examples described herein. The computer readable code may be encoded on a non-transitory computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
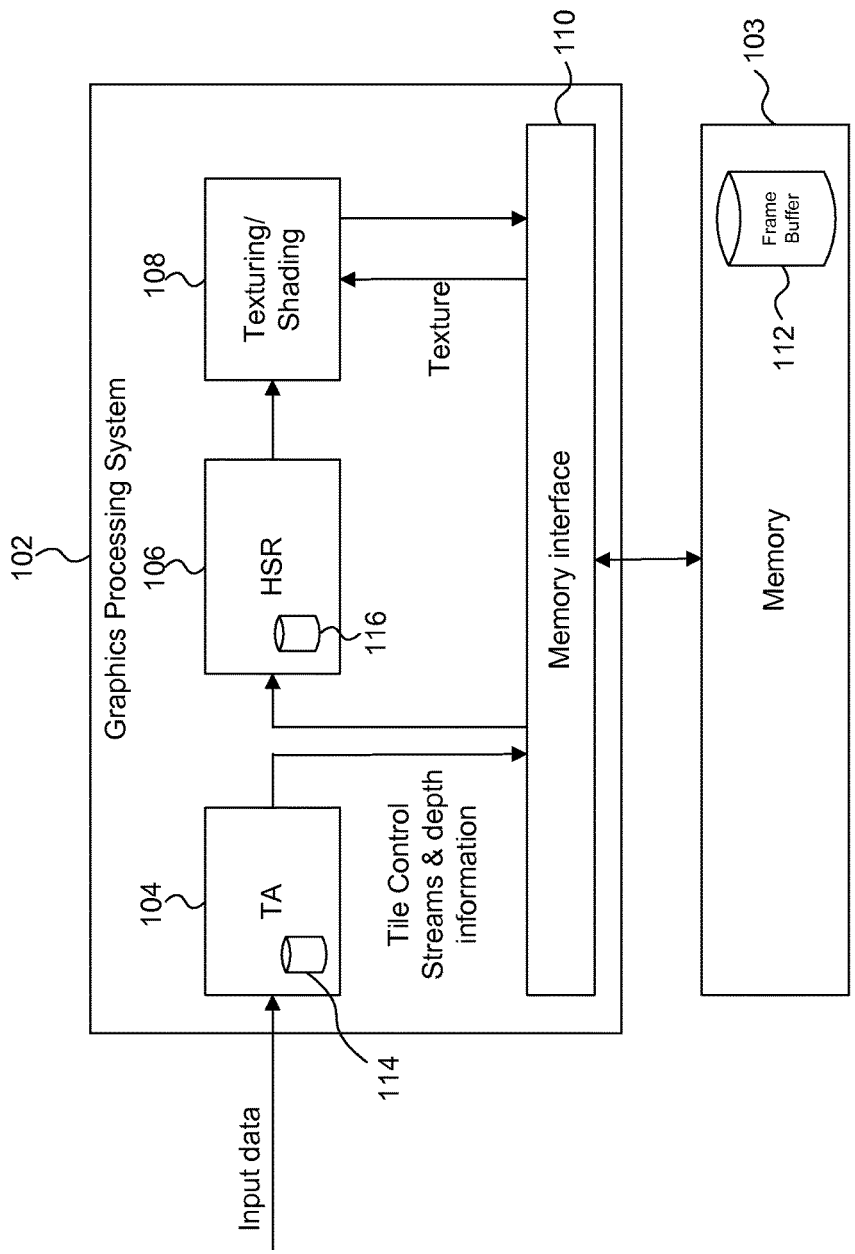
FIG. 1 shows an example of a graphics processing system usable with the present disclosure.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

FIG. 1 shows a graphics processing system 102 which can communicate with a memory 103. The graphics processing system 102 comprises a tiling unit (TU) 104 (which may be referred to as a tile accelerator, or TA), a hidden surface removal (HSR) unit 106 (which may be referred to as an image synthesis processor, or ISP), a texturing/shading unit 108 and a memory interface 110. The memory 103 is configured to store data and includes a frame buffer 112 for storing rendered image data. The tiling unit 104 comprises a TU depth buffer store 114. The HSR unit 106 comprises a HSR depth buffer 116. As would be apparent to a person skilled in the art, the graphics processing system 102 may include other units, but for clarity these other units are not shown in FIG. 1. The tiling unit 104 is arranged to receive input graphics data (which includes data defining primitives in the 3D scene to be rendered). An output of the tiling unit 104 is coupled to the memory interface 110 for providing tile control streams and depth information (as described in more detail below) to the memory 103 which may for example be off-chip compared to a chip on which the graphics processing system 102 is implemented. The HSR unit 106 is coupled to the memory interface 110 for receiving tile control streams and depth information from the memory. An output of the HSR unit 106 is coupled to an input of the texturing/shading unit 108. The texturing/shading unit 108 is also coupled to the memory interface 110 for receiving texture data from the memory. In the example shown in FIG. 1 the frame buffer 112 is stored in the memory 103 and an output of the texturing/shading unit 108 is coupled to the memory interface 110 in order to access the frame buffer 112.

Figure 2:
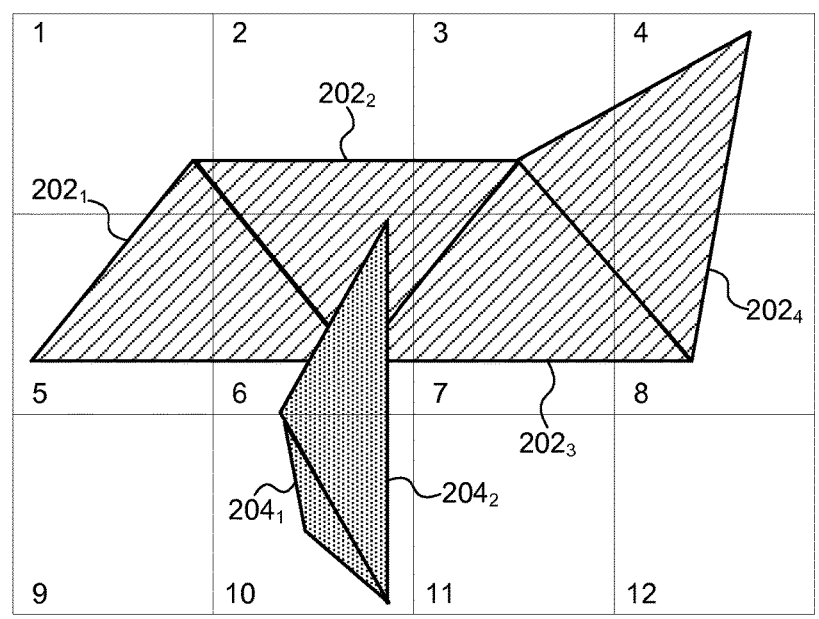
FIG. 2 represents the primitives of two objects within twelve tiles of a rendering space.

FIG. 2 represents the primitives of two objects within twelve tiles of the rendering space of the graphics processing system 102. The twelve tiles are numbered 1 to 12 in FIG. 2, and as an example each tile may represent a 32×32 block of sample positions (e.g. pixels) within the image. In other examples, the tiles may have different shapes and/or sizes, and there may be more, or fewer, than twelve tiles in the rendering space. A first object shown in FIG. 2 comprises four primitives: $202_1$, $202_2$, $202_3$ and $202_4$. It can be seen that parts of the primitive $202_1$ are present in tiles 1, 2, 5 and 6; parts of the primitive $202_2$ are present in tiles 1, 2, 3, 6 and 7; parts of the primitive $202_3$ are present in tiles 3, 6, 7 and 8; and parts of the primitive $202_4$ are present in tiles 3, 4, 7 and 8. A second object shown in FIG. 2 comprises two primitives: $204_1$ and $204_2$. It can be seen that parts of primitive $204_1$ are present in tile 10; and parts of primitive $204_2$ are present in tiles 6 and 10. The primitives shown in FIG. 2 are opaque primitives, and it can be seen in FIG. 2 that some of the parts of primitive $204_2$ overlap, and hide from view, some parts of primitives $202_1$, $202_2$ and $202_3$ in tile 6. Therefore, some of the parts (e.g. fragments) of primitives $202_1$, $202_2$ and $202_3$ in tile 6 may be discarded in HSR unit 106 before they are textured and/or shaded in the texturing/shading unit 108.

Figure 3:
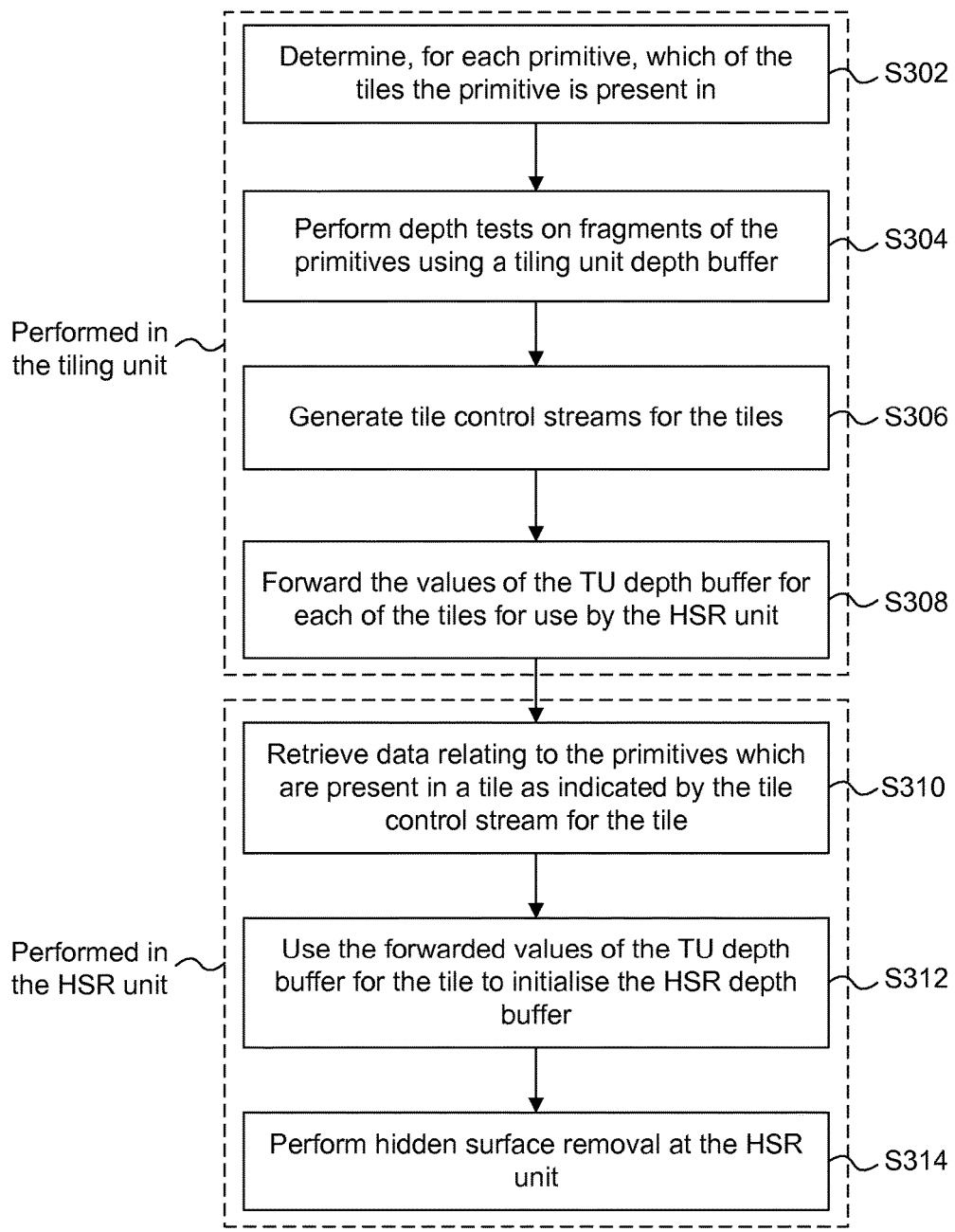
FIG. 3 shows a flow chart for a method of processing primitives in a graphics processing system.

In examples described herein primitive depth information is calculated in the tiling unit 104 and forwarded to the HSR unit 106 to pre-fill the HSR depth buffer 116 used by the HSR unit 106 to perform the HSR. This takes advantage of the fact that the tiling unit 104 has access to the primitive data before the HSR unit 106 performs the HSR on the fragments of the primitives, to determine some depth information which can simplify the HSR performed by the HSR unit 106. This is particularly useful because the tiling unit 104 often processes all of the primitive data for a tile before any of the primitives of that tile are processed in the HSR unit 106. Therefore, the final values of a depth buffer determined in the tiling unit 104 can be used in the HSR unit 106 to determine that a particular fragment will subsequently be hidden by a fragment of a primitive which is yet to be processed in the HSR unit 106, such that the particular fragment can be culled. The operation of the graphics processing system 102 is described with reference to the flow chart shown in FIG. 3.

The tiling unit 104 receives the input data defining primitives in the 3D scene to be rendered, e.g. from an application such as game. The primitives are received as a sequence of data and are processed sequentially in the tiling unit 104. In particular, in step S302 the tiling unit 104 determines, for each of the primitives, which of the tiles the primitive is present in.

In step S304, the tiling unit 104 performs depth tests on fragments of the primitives as they are processed in the tiling unit (i.e. while the tiling unit 104 has access to the primitive data for the purposes of performing tiling calculations) to thereby determine depth information for the tiles. The depth tests performed by the tiling unit 104 are based on depth values of a tiling unit depth buffer for a tile (referred to herein as a "TU depth buffer") which is stored in the tiling unit depth buffer store 114. The TU depth buffer for a tile indicates depth values at sample positions of the tile, and is maintained by the tiling unit 104 as the primitives are processed by the tiling unit 104. The use of a TU depth buffer is described below in relation to FIG. 4.

In step S306 the tiling unit 104 generates tile control streams for the tiles, wherein the tile control stream for a tile includes indicators of primitives which are present in that tile. For example a tile control stream for a tile may include a list of object pointers to indicate which primitives include fragments which are present in the tile. The tile control streams are passed from the tiling unit 104 to a memory via the memory interface 110. A tile control stream for a tile is subsequently retrieved by the HSR unit 106 from the memory so that the HSR unit 106 can read the primitives indicated by the control stream and perform hidden surface removal on the fragments of the primitives that are present in the tile.

FIG. 4(a) represents a column of a TU depth buffer which represents the depth values at a column of 32 sample positions of a tile. The depth (or "Z") values of fragments which are present in the tile are in this example, represented by values in the range from 0.0 to 1.0, with a smaller depth value representing a closer fragment and a larger depth value representing a more distant fragment. The maximum and minimum depth values (i.e. depth values of 1.0 and 0.0) are shown as dotted lines in FIG. 4(a), and the viewpoint is represented to the left of the diagram. The line 402 represents the depth values stored in the TU depth buffer for the 32 samples of the column of the tile shown in FIG. 4(a) at a particular time during the processing of the primitives within the tile.

Figure 4:
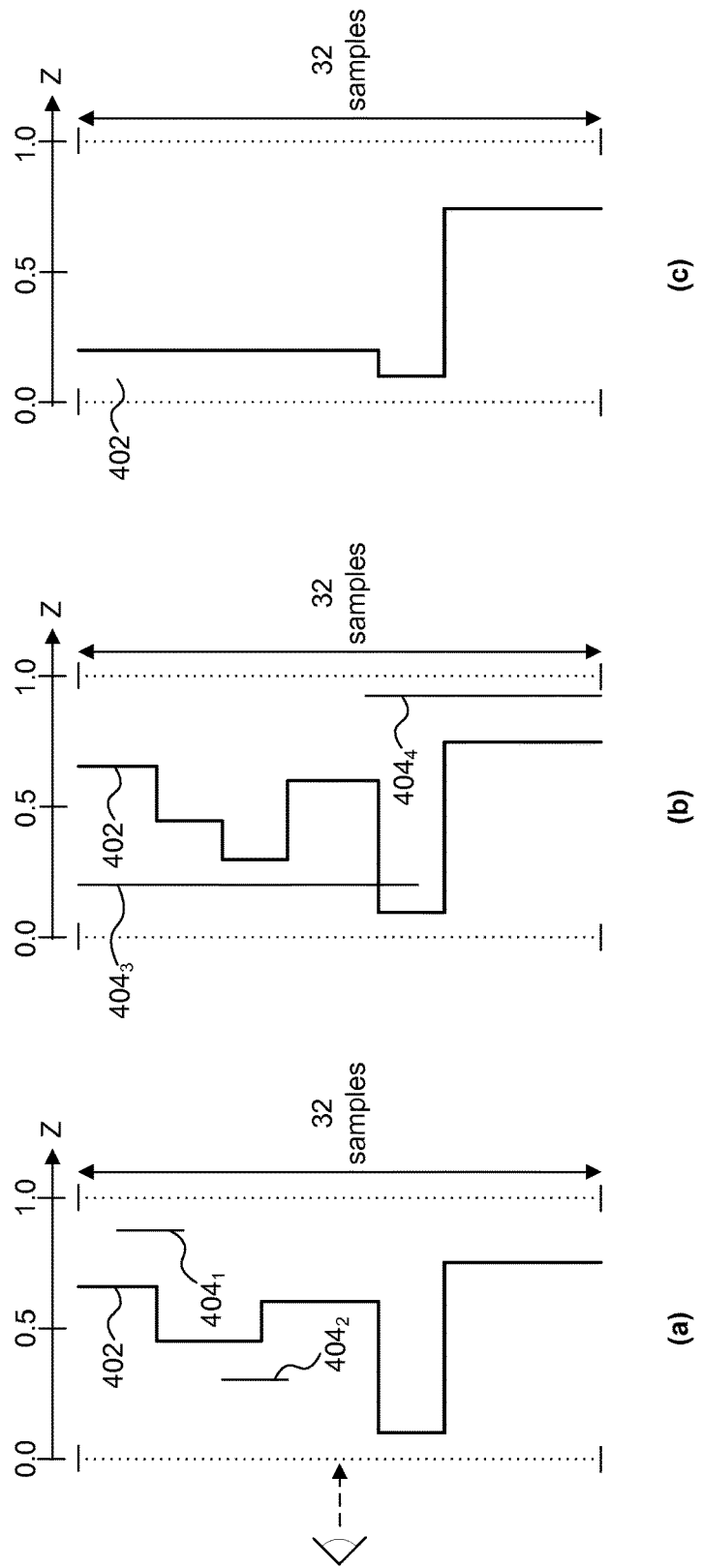
FIG. 4 shows the depth values of a tiling unit depth buffer in three scenarios in a first example.

A primitive $404_1$ then arrives at the tiling unit 104, and for each tile in which it is determined to be present, the primitive is sampled to generate a first group of fragments, each fragment corresponding to a location (i.e. a "sample position") in the tile, and having a depth value. As shown in FIG. 4(a), the fragments of the primitive $404_1$ are behind previously processed fragments for the tile, i.e. the fragments of the primitive $404_1$ have depth values which are greater than the depth values stored in the TU depth buffer at the corresponding sample positions of the tile. In the simple example shown in FIG. 4, all of the fragments of the primitives are fully opaque. Other examples described below show how primitives which are not fully opaque are handled.

The tiling unit 104 performs the depth tests by comparing the depth values of the fragments of the incoming primitives to the depth values in the TU depth buffer at the corresponding sample positions of the tile in accordance with a depth compare mode. Each object that is to be processed in the graphics processing system 102 has an associated depth compare mode (DCM) which indicates how to decide whether the fragments of the primitives of the object pass the depth tests. For example, the depth compare mode may be DCM_LESS_EQ in which a fragment passes the depth test if it has a depth value which is less than or equal to the depth value currently stored in the TU depth buffer. This depth compare mode is often used when a smaller depth value represents a closer fragment and a larger depth value represents a more distant fragment, because realistic rendering occurs when closer fragments pass the depth test and hide from view previously processed fragments with greater depth values.

If a fragment of a primitive passes the depth test then the depth value of the fragment is used to update the depth value in the TU depth buffer at the corresponding sample position of the tile, and an indicator (e.g. a tag) of the primitive is included in the tile control stream for the tile, such that the primitive is not culled from further processing. However, if a fragment of a primitive fails the depth test then the TU depth buffer is not updated with the depth value of the fragment. If a primitive includes no fragments that pass the depth test in a tile then an indicator for the primitive is not included in the tile control stream for the tile, such that the primitive is culled from further processing. In other words, the tiling unit 104 includes an indicator of a primitive in the tile control stream for a tile only if the primitive includes at least one fragment which passes the depth test and which is present in the tile. This allows for a reduction in the amount of data that needs to be included in the tile control streams.

Data relating to the primitives may be stored in a memory for retrieval by the HSR unit 106 according to the indicators in the tile control streams. The tiling unit 104 may determine whether a particular primitive has no fragments which passed the depth test in any of the tiles. If this is the case then the primitive might not be written to a memory for retrieval by the HSR unit 106, such that the primitive is discarded. In some examples, primitives are stored in primitive blocks, and the tiling unit 104 may determine whether a particular primitive of a particular primitive block has no fragments which passed the depth test in any of the tiles, and if this is the case, the tiling unit 104 may remove that particular primitive from the particular primitive block. Furthermore, the tiling unit 104 may determine whether a particular primitive block includes no primitives which have any fragments which passed the depth test in any of the tiles, and if this is the case, the tiling unit 104 may remove the entire particular primitive block from the memory. This helps to reduce the amount of primitive data stored in the memory.

When the tiling unit is operating in the DCM_LESS_EQ mode, none of the fragments of the primitive $404_1$ pass the depth tests. The primitive $404_1$ may therefore be culled (i.e. an indicator for the primitive is not added to the control stream for the tile) and the depth values in the TU depth buffer are not updated.

After the tiling unit 104 has performed the depth tests on the fragments of the primitive $404_1$, another primitive $404_2$ arrives at the tiling unit 104. As shown in FIG. 4(a), the fragments of the primitive $404_2$ are in front of the previously processed fragments for the tile, i.e. the fragments of the primitive $404_2$ have depth values which are less than the depth values stored in the TU depth buffer at the corresponding sample positions of the tile. Therefore, when the tiling unit is operating in the DCM_LESS_EQ mode, the fragments of the primitive $404_2$ pass the depth tests. The corresponding depth values in the TU depth buffer are updated with the depth values of the fragments of the primitive $404_2$, and the primitive $404_2$ is not culled.

FIG. 4(b) shows the same column of the depth buffer as that shown in FIG. 4(a) after the tiling unit 104 has performed the depth tests on the fragments of the primitives $404_1$ and $404_2$. The line 402 in FIG. 4(b) shows that the depth values stored in the TU depth buffer have been updated to include the depth values of the fragments of the primitive $404_2$ but not to include the depth values of the fragments of the primitive $404_1$. Then, a third primitive $404_3$ arrives at the tiling unit 104. As shown in FIG. 4(b), some of the fragments of the primitive $404_3$ are in front of the previously processed fragments for the tile, i.e. those fragments of the primitive $404_3$ have depth values which are less than the depth values stored in the TU depth buffer at the corresponding sample positions of the tile. However, at some sample positions in the tile, the corresponding fragments of the primitive $404_3$ are behind the previously processed fragments for the tile, i.e. those fragments of the primitive $404_3$ have depth values which are greater than the depth values stored in the TU depth buffer at the corresponding sample positions of the tile. Therefore, when the tiling unit 104 is operating in the DCM_LESS_EQ mode, some of the fragments of the primitive $404_3$ pass their depth tests, but other fragments of the primitive $404_3$ fail their depth tests. The appropriate depth values in the TU depth buffer are updated with the depth values of the fragments of the primitive $404_3$, and the primitive $404_3$ is not culled.

Then, a fourth primitive $404_4$ arrives at the tiling unit 104. As shown in FIG. 4(b), the fragments of the primitive $404_4$ are behind the previously processed fragments for the tile, i.e. the fragments of the primitive $404_4$ have depth values which are greater than the depth values stored in the TU depth buffer at the corresponding sample positions of the tile. Therefore, when the tiling unit 104 is operating in the DCM_LESS_EQ mode, none of the fragments of the primitive $404_4$ pass the depth tests. The primitive $404_4$ may therefore be culled and the depth values in the TU depth buffer are not updated.

FIG. 4(c) shows the same column of the depth buffer as that shown in FIGS. 4(a) and 4(b) after the tiling unit 104 has performed the depth tests on the fragments of the primitives $404_1$, $404_2$, $404_3$ and $404_4$. The line 402 in FIG. 4(c) shows that the depth values stored in the TU depth buffer have been updated to include the depth values of some of the fragments of the primitive $404_3$ but not to include the depth values of the fragments of the primitive $404_4$. Furthermore, after the tiling unit 104 has performed the depth tests on the fragments of the primitives $404_1$, $404_2$, $404_3$ and $404_4$, the primitives $404_1$ and $404_4$ have been culled and do not have identifiers included in the tile control stream for the tile, whereas the primitives $404_2$ and $404_3$ have not been culled and have identifiers included in the tile control stream for the tile. It is noted that although the primitive $404_2$ is behind the primitive $404_3$, the primitive $404_2$ is not culled because the fragments of incoming primitives are only depth tested against the cumulative depths of all of the previously processed fragments as indicated by the TU depth buffer, and primitive $404_2$ was processed before primitive $404_3$. In this simple example, there are no more primitives present in the tile which have not been processed by the tiling unit 104, so the values of the TU depth buffer shown in FIG. 4(c) represent final values of the TU depth buffer.

In step S308, when the tiling unit 104 has finished processing the fragments of primitives that are present in a tile, the tiling unit 104 forwards the values of the TU depth buffer for the tile for use by the HSR unit 106. In order to "forward" the values of the TU depth buffer, the tiling unit 104 might not send the values of the TU depth buffer directly to the HSR unit 106, and instead the tiling unit 104 may cause the values of the TU depth buffer to be stored (e.g. in the memory 103) such that they are subsequently available to be retrieved by the HSR unit 106. The values of the TU depth buffer for a tile represent depth information which can be used by the HSR unit 106 in performing HSR on the fragments of the primitives indicated in the tile control streams. The tiling unit 104 may forward the values of the TU depth buffers for all of the tiles after all of the primitives in all of the tiles have been processed by the tiling unit 104, or alternatively, the tiling unit 104 may forward the values of a TU depth buffer for a tile when all of the primitives in that tile have been processed by the tiling unit 104 irrespective of whether primitives in other tiles have not yet been processed by the tiling unit 104. In other examples, some depth information for a tile can be forwarded from the tiling unit 104 in response to some trigger, e.g. if the depth compare mode changes, even if this is before the tiling unit 104 has finished processing the fragments of primitives that are present in the tile. In the example shown in FIG. 1, the depth information (i.e. the values of the TU depth buffers) forms a depth record which is passed with the tile control streams from the tiling unit 104 to a memory, such that the depth record for a tile can be retrieved by the HSR unit 106 with the corresponding tile control stream for the tile. The depth record for a tile could be stored separately to the tile control stream for the tile. Alternatively, the depth record for a tile could be included as part of the tile control stream for the tile.

The HSR unit 106 is configured to perform the hidden surface removal on a tile-by-tile basis on the fragments of the primitives which are present in a tile. In order to process the fragments of the primitives which are present in a tile, the HSR unit 106 receives the tile control stream and the depth information (e.g. a "depth record") for the tile from the memory. In step S310, the HSR unit 106 retrieves data relating to the primitives which are present in the tile as indicated by the tile control stream for the tile.

The HSR unit 106 is configured to use the HSR depth buffer 116 to perform depth tests on the fragments of the primitives which are present in a tile. In step S312 the HSR unit 106 uses the forwarded values of the TU depth buffer for the tile to set values of the HSR depth buffer 116. In this way the HSR depth buffer 116 may be suitably initialised for a tile before performing depth tests on fragments of the tile. As described in more detail below, in some examples the HSR depth buffer 116 may be set to have the same depth values as those in the TU depth buffer, but in other examples the HSR depth buffer 116 might be set to have slightly different depth values to those in the TU depth buffer for the tile.

In step S314 the HSR unit 106 uses the depth values in the HSR depth buffer 116 to perform hidden surface removal on the fragments of the primitives which are indicated as being present in the tile by the tile control stream. The hidden surface removal performed in the HSR unit 106 works in a similar way to the hidden surface removal performed in the tiling unit 104. That is, depth tests are performed on fragments of primitives which are present in the tile by sampling the incoming primitives to generate fragments and then comparing the depth values of the generated fragments with the depth values stored in the HSR depth buffer 116, wherein if a fragment passes the depth test then the corresponding value in the HSR depth buffer 116 is updated and the fragment is not culled, whereas if a fragment does not pass the depth test then the fragment is culled and the corresponding value in the HSR depth buffer 116 is not updated. It is noted that in the HSR unit 106, an individual fragment can be culled if it fails its depth test (even if other fragments of the same primitive in the same tile pass their depth tests), which is not the case for the depth tests performed in the tiling unit 104 in the examples described above. That is, as described above, a primitive may be culled in the tiling unit 104 for a tile only when all of the fragments of the primitive within the tile fail their depth tests.

The depth information forwarded from the tiling unit 104 is used to pre-fill the HSR depth buffer 116, e.g. based on the final TU depth buffer values for the tile, before any of the primitives are processed in the HSR unit 106 for the tile. Therefore, the depth test performed by the HSR unit 106 acts as the second pass over the primitive data. This may allow the HSR unit 106 to reject more fragments of primitives in the depth test (before passing them to the texturing/shading unit 108) than if the tiling unit 104 had not performed a depth test (as in the prior art described in the background section above). For example, more fragments can be rejected by the depth test in the HSR unit 106 when translucent or punch through fragments are hidden by opaque fragments. The HSR unit 106 sends visible fragments, which survive the depth testing (i.e. are not culled) in the HSR unit 106, to the texturing/shading unit 108 where the fragments are textured and/or shaded before being sent to the frame buffer 112 for display.

Following on from the example described above in relation to FIGS. 4(a) to 4(c), the HSR depth buffer 116 will be initialised to have depth values in accordance with the TU depth buffer for the tile as shown by the line 402 in FIG. 4(c), i.e. after all of the primitives in the tile have been processed by the tiling unit 104. The HSR unit 106 performs depth tests (in the same depth compare mode as that used by the tiling unit 104, e.g. the DCM_LESS_EQ mode) on the fragments generated from the primitives which were not culled after the depth testing performed in the tiling unit 104. Therefore, when the HSR unit 106 performs hidden surface removal on the fragments of the primitive $404_2$, the fragments will fail the depth tests against the pre-filled HSR depth buffer 116, because the depth values forwarded from the TU depth buffer indicate that the fragments of the primitive $404_2$ will eventually be hidden by the fragments of a closer object. The closer object is primitive $404_3$, although primitive $404_3$ has not been processed by HSR unit 106 at the time that the fragments of primitive $404_2$ fail the depth tests. This saves some processing in the HSR unit 106 (e.g. the HSR depth buffer 116 does not need to be updated) compared to the situation where the HSR depth buffer 116 is not initialised based on the depth values from the TU depth buffer for the tile.

However, a much larger processing saving would occur in a situation in which the primitive $404_2$ is not opaque, e.g. when it is translucent. In that case if the HSR depth buffer 116 was not initialised based on the depth values of the TU depth buffer for the tile, the HSR unit 106 would flush fragments covered by the translucent primitive to the texturing/shading unit 108 so that a blend operation could be performed between the fragments of the translucent primitive $404_2$ and fragments of other objects previously rendered. The processing involved in flushing fragments to the texturing/shading unit 108, performing the texturing and shading operations, and blending the fragments will ultimately have been wasted because the fragments of the opaque primitive $404_3$ will cover the fragments of the primitive $404_2$. However, in the examples described herein, the depth testing in the tiling unit 104 allows the depth testing in the HSR unit 106 to use the final TU depth buffer values for a tile when performing depth tests on the fragments of the tile. Therefore, the fragments of the primitive $404_2$ would fail the depth test in the HSR unit 106 because the depth values in the HSR depth buffer 116 have been prefilled to take account of the depth of the primitive $404_3$. Therefore, the unnecessary processing involved in flushing and blending translucent fragments is avoided. The use of translucent and other complex textures is becoming more prevalent and these textures are typically relatively complicated to process, so avoiding unnecessary processing of primitives with these textures is useful.

The depth testing performed in the tiling unit 104 uses the same principles of the Z-buffering technique as the HSR unit 106, but different depth buffers are used. The number of bits used to represent the depth values may be the same or may be different in the tiling unit 104 and the HSR unit 106. For example, the depth values may each be represented by 32 bits in the HSR depth buffer 116, whereas the corresponding depth values may each be represented by fewer bits (e.g. 16 or 12 bits) in the TU depth buffer 114, wherein a conversion between the different formats may be implemented, e.g. in the tiling unit 104 or in the HSR unit 106. In this way, the number of bits of data that are processed in the tiling unit 104 for the purpose of performing the depth testing may be reduced compared to using the full 32-bit depth values in the tiling unit 106.

In the examples described above, the TU depth buffer for a tile is maintained at a full resolution, i.e. with one depth value for each sample position within the tile. In other examples, the TU depth buffer for a tile may be maintained at a reduced resolution, where each depth value in the TU depth buffer represents a depth of a block of more than one sample position within the tile (e.g. a 2×2, 4×4 or 8×8 block of sample positions). Even if the TU depth buffer is determined at full resolution in the tiling unit 104, it may be beneficial to use a reduced resolution version of the TU depth buffer as the depth information which is forwarded for use by the HSR unit 106 because this reduces the amount of data included in the depth information.

Figure 12:
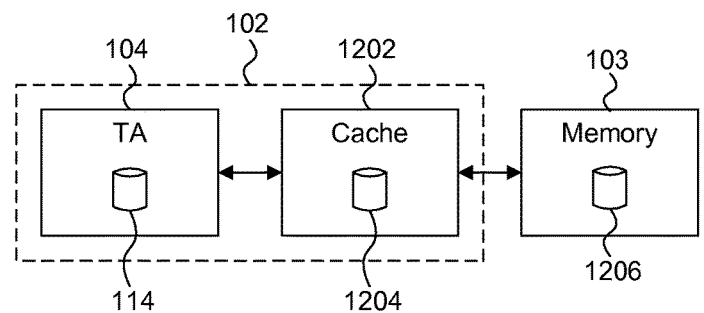
FIG. 12 shows different memory locations where depth values may be stored.

For example, the depth information which is forwarded from the tiling unit 104 may comprise values of a coarse TU depth buffer, wherein each value of the coarse TU depth buffer represents a block of values within the full resolution TU depth buffer. The tiling unit 104 determines the values of the coarse TU depth buffer for a tile in a conservative manner based on the corresponding blocks of values within the full-resolution TU depth buffer for the tile. Determining a coarse value of the coarse depth buffer in a "conservative manner" means that the coarse value provides the least stringent depth test of any of the full-resolution depth values in the corresponding block of the full-resolution depth buffer. For example, if the depth compare mode is DCM_LESS_EQ then a higher depth value in a depth buffer provides a less stringent depth test than a lower depth value, so a coarse depth value takes the highest depth value of the corresponding block of full-resolution depth values. In contrast, if the depth compare mode is DCM_GREATER_EQ then a lower depth value in a depth buffer provides a less stringent depth test than a higher depth value, so a coarse depth value takes the lowest depth value of the corresponding block of full-resolution depth values. The tiling unit 104 operates on primitives which may overlap with many tiles, therefore the tiling unit 104 may simultaneously maintain respective depth buffers for a plurality of the tiles. FIG. 12 shows an example in which the graphics processing system 102 comprises the tiling unit 104 and a cache memory 1202. The tiling unit 104 includes the TU depth buffer 114 and the cache memory 1202 includes a cache depth buffer 1204. The memory 103 includes a coarse depth buffer 1206. As an example, the TU depth buffer 114 may be configured to store full resolution depth values for a single tile at a time. The coarse depth buffer 1206 is configured to store coarse depth values for all of the tiles of the image (e.g. approximately 1000 tiles). The cache depth buffer 1204 may be configured to store depth values for some but not all of the tiles of the image (e.g. for four of the tiles) at a time. The resolution of the depth values stored in the cache depth buffer 1204 may be different in different examples. To give three examples: (i) full resolution depth values may be stored in the cache depth buffer 1204 so that accuracy is not lost when the tiling unit 104 writes data values for a tile to the cache depth buffer 1204 and then subsequently reads those depth values for the tile back from the cache depth buffer 1204, (ii) mid-resolution depth values (i.e. lower resolution than full resolution but higher resolution than the coarse depth values stored in the coarse depth buffer 1206) may be stored in the cache depth buffer 1204 to thereby reduce the memory requirements of the cache memory 1202 and/or allow depth values for more tiles to be stored in the cache depth buffer 1204 at any given time, thereby increasing the cache hit rate, or (iii) coarse resolution depth values (i.e. the same resolution as the depth values stored in the coarse depth buffer 1206) may be stored in the cache depth buffer 1204, which would further reduce the memory requirements of the cache memory 1202 and/or allow depth values for more tiles to be stored in the cache depth buffer 1204 at any given time but would reduce the accuracy of the depth values if the tiling unit 104 writes depth values for a tile to the cache memory 1202 and then subsequently reads them out again. When the tiling unit 104 changes the tile for which depth testing is being performed, the depth values for the previous tile may be stored in the cache depth buffer 1204 of the cache memory 1202. In this way, the cache depth buffer 1204 stores depth values for a number (e.g. four) of most recently processed tiles. This allows the depth values to be retrieved from the cache memory 1202 when the tiling unit 104 returns to the previous tile, without needing to access the memory 103. If a tile's depth values are not stored in the cache memory 1202 when the tiling unit 104 needs to access the depth values for that tile (i.e. if there is a cache miss) then the tile's depth values are retrieved from the memory 103 for use by the tiling unit 104. As described above, the resolution of the depth values may be different for the different depth buffers (114, 1204 and 1206), so when depth values are transferred between the depth buffers some processing may be performed in order to determine the depth values at the appropriate new resolution, which as described above, is done in a conservative manner.

Figure 5:
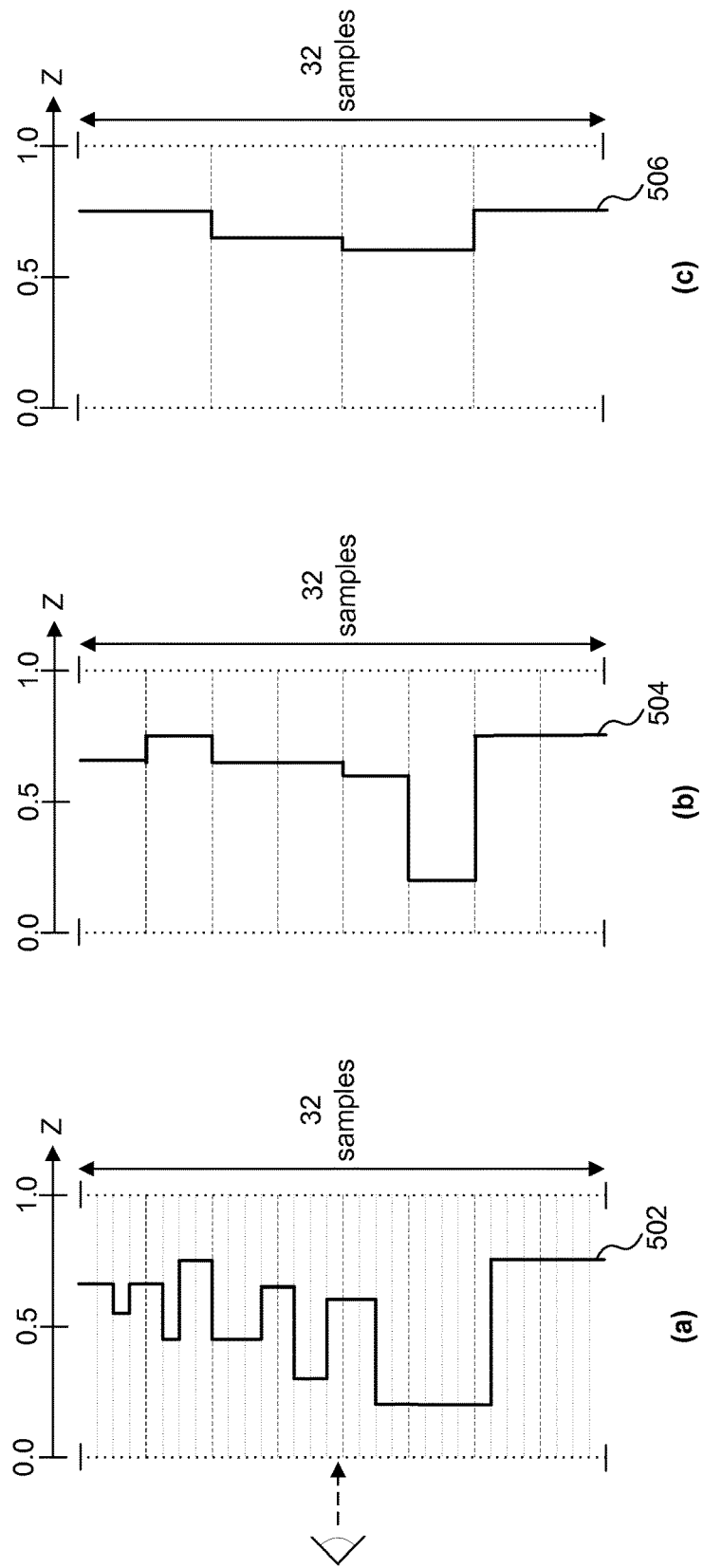
FIG. 5 shows how the depth values of a tiling unit depth buffer may be used to determine depth values for coarse depth buffers in a conservative manner.

FIG. 5 shows an example in which the DCM_LESS_EQ mode is implemented where the line 502 in FIG. 5(*a*) represents the full-resolution depth values of a column of the TU depth buffer for a tile when all of the primitives which are present in the tile have been processed in the tiling unit 104. The line 504 in FIG. 5(*b*) shows the corresponding coarse depth values where each coarse value represents a 4×4 block of the full-resolution depth values shown in FIG. 5(*a*). Each of the coarse depth values in FIG. 5(*b*) takes the highest of the sixteen full-resolution depth values in the corresponding 4×4 block. It is noted that, for clarity, it is assumed that the column of samples shown in FIG. 5(*a*) includes the highest of the depth values in each of the 4×4 full-resolution blocks. FIG. 5(*c*) shows another coarse depth buffer which has an even lower resolution than that shown in FIG. 5(*b*). In particular, the line 506 in FIG. 5(*c*) shows coarse values representing an 8×8 block of the full-resolution depth values shown in FIG. 5(*a*). Each of the coarse depth values in FIG. 5(*c*) takes the highest of the sixty-four full-resolution depth values in the corresponding 8×8 block. Again, it is noted that, for clarity, it is assumed that the column of samples shown in FIG. 5(*a*) includes the highest of the depth values in each of the 8×8 full-resolution blocks. Obviously, a single coarse depth value can be represented using fewer bits of data than the corresponding block of (e.g. sixteen or sixty-four) full-resolution depth values.

Figure 6:
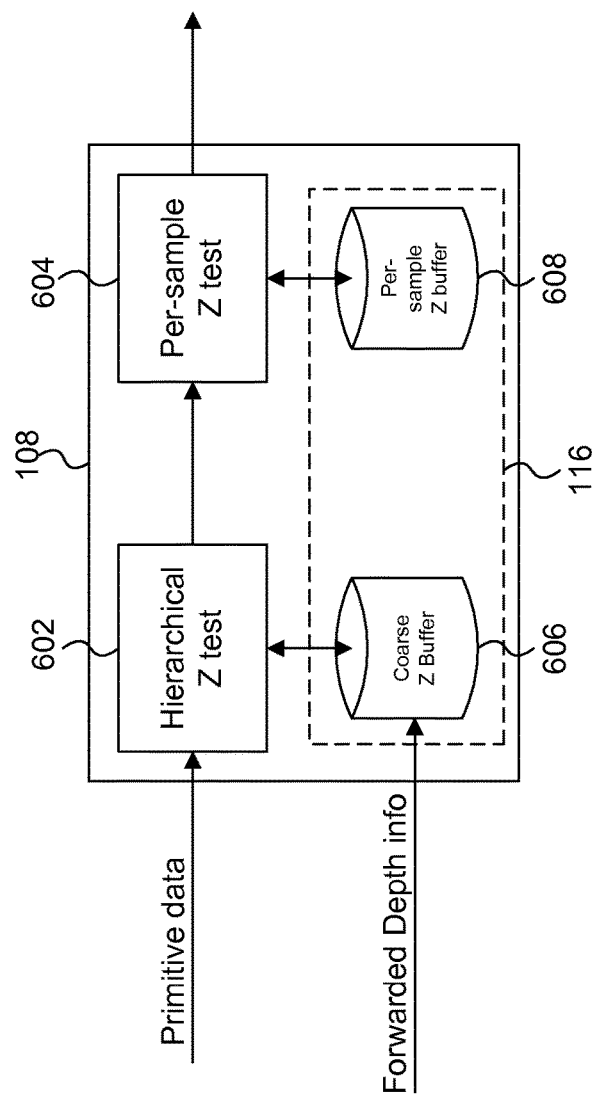
FIG. 6 is a schematic diagram of a HSR unit in an example embodiment.

Furthermore, in some examples, the hidden surface removal performed by the HSR unit 106 includes: (i) one or more initial HSR stages (which may be referred to as a "hierarchical depth test") which are performed at a respective one or more coarse scales which do not include per-sample depth tests, and (ii) a subsequent full-resolution HSR stage which is performed at the sample scale and which does include per-sample depth tests. FIG. 6 shows an example in which the HSR unit 108 comprises a hierarchical depth testing module 602, and a per-sample depth testing module 604, and wherein the HSR depth buffer 116 comprises a coarse depth buffer 606 and a full-resolution depth buffer 608. The hierarchical depth testing module 602 is arranged to receive the primitive data for primitives which are present in a tile and is arranged to sample the primitives to determine fragments of the primitives and to combine the fragments conservatively so as to generate coarse fragments at the coarse resolution of the coarse depth values. The hierarchical depth testing module 602 is further arranged to perform the hierarchical depth test on the coarse fragments using coarse depth values for the tile which are stored in the coarse depth buffer 606. The per-sample depth testing module 604 is arranged to receive the primitive data for fragments of primitives which are present in a tile and which have not been culled by the hierarchical depth testing module 602, and to perform the per-sample depth testing using full-resolution depth values for the tile which are stored in the full resolution depth buffer 608. The hierarchical depth tests require fewer depth comparison operations to be performed than per-sample depth tests because coarse blocks (e.g. 4×4 or 8×8 blocks) of samples are considered at a time and can be culled more efficiently, if the depth tests fail, than if each sample within the block is separately depth tested. This is very useful if large areas of the tile include fragments which can be culled, since it reduces the number of fragments that need to be depth tested on a per-sample basis in the per-sample depth test module 604. Reducing the number of per-sample tests that need to be performed can increase the efficiency of the HSR performed by the HSR unit 106.

In the example shown in FIG. 6, the values of the coarse depth buffer 606 are at the same coarse scale of the coarse TU depth buffer, such that the values of the coarse TU depth buffer (i.e. the depth information forwarded from the tiling unit 104) can be used to initialise the depth values in the coarse depth buffer 606 in the HSR unit 108. This allows the HSR unit 106 to handle the forwarded depth information in a very simple manner. In other examples, the scale of the depth values of the forwarded depth information may be different to the scale of the coarse depth buffer 606, in which case the HSR unit 108 may manipulate the forwarded depth information such that it can correctly initialise the depth values in the coarse depth buffer 606.

In some examples, there may be more than one hierarchical depth testing module 602 arranged in series (with corresponding coarse depth buffers), wherein the scale of the depth testing is different, and getting finer, along the series of modules. For example, a first hierarchical depth testing module may perform depth tests at the scale of 8×8 blocks of fragments, then a second hierarchical depth testing module may perform depth tests at the scale of 4×4 blocks of the remaining fragments, and then the per-sample depth testing module 604 may perform the per-sample depth tests on the remaining fragments.

Some objects may have different depth compare modes to the DCM_LESS_EQ mode described above, e.g. for producing special effects or to overlay a control panel on top of an image, etc. For example, some other depth compare modes are: (i) DCM_GREATER_EQ in which a fragment passes the depth test if its depth value is greater than or equal to the corresponding depth value in the appropriate depth buffer; (ii) DCM_LESS in which a fragment passes the depth test if its depth value is less than the corresponding depth value in the appropriate depth buffer; (iii) DCM_GREATER in which a fragment passes the depth test if its depth value is greater than the corresponding depth value in the appropriate depth buffer; (iv) DCM_ALWAYS in which a fragment always passes the depth test; (v) DCM_NEVER in which a fragment never passes the depth; (vi) DCM_EQUAL in which a fragment passes the depth test if its depth value is equal to the corresponding depth value in the appropriate depth buffer; and (vii) DCM_NOT_EQUAL in which a fragment passes the depth test if its depth value is not equal to the corresponding depth value in the appropriate depth buffer.

Figure 7:
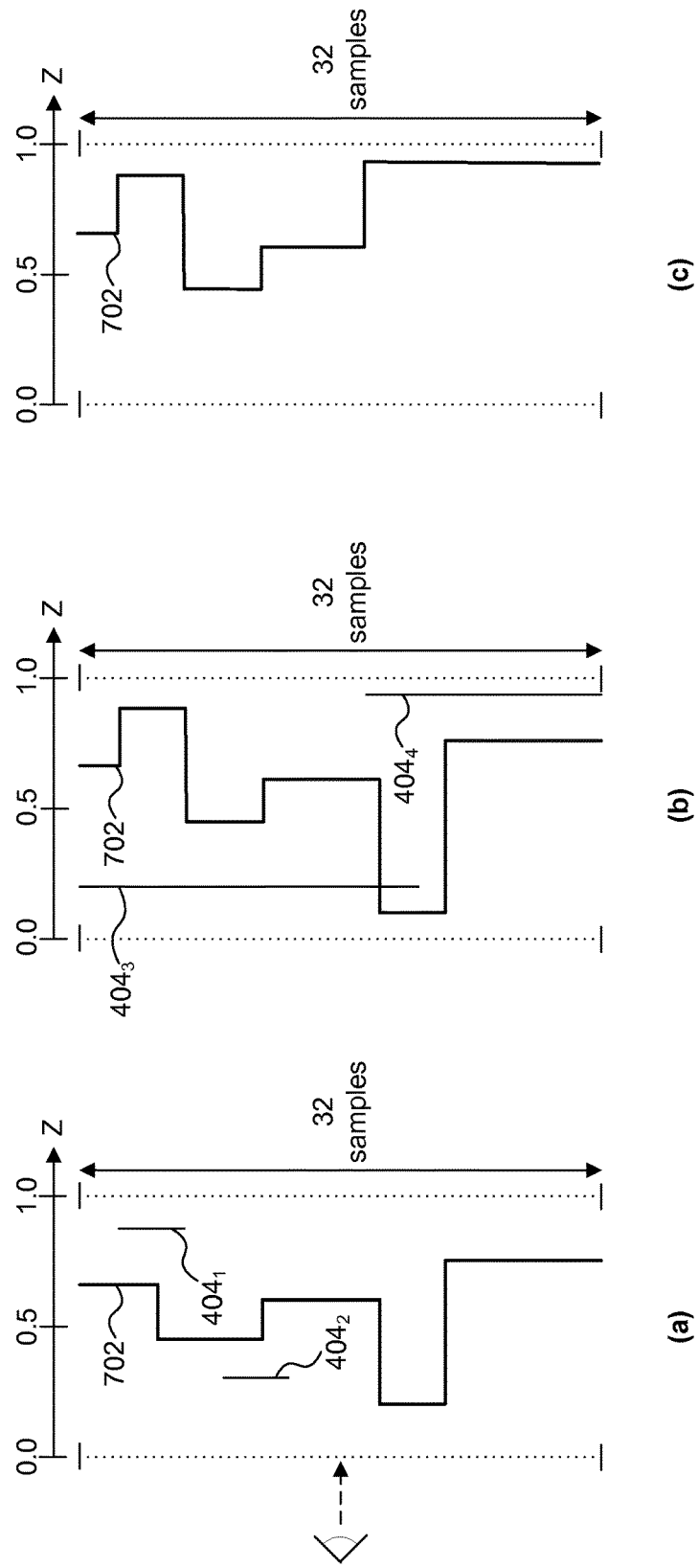
FIG. 7 shows the depth values of a tiling unit depth buffer in three scenarios in another example embodiment.

As an example, FIG. 7 shows how the depth values in the TU depth buffer for a tile would be updated if the DCM_GREATER_EQ mode was used in the tiling unit 104 when the same primitives are received at the tiling unit 104 as those shown in FIG. 4. The line 702 shows the current depth value in the column of 32 samples of the TU depth buffer. As illustrated in FIG. 7(a), the fragments of the primitive $404_1$ will pass the depth test, because their depth values are greater than the current depth values represented by line 702, but the fragments of the primitive $404_2$ will fail the depth test, so the depth values in the TU depth buffer are updated using the depth values of the primitive $404_1$ but not the depth values of the primitive $404_2$, as shown by the line 702 in FIG. 7(b). Then the primitives $404_3$ and $404_4$ are received at the tiling unit 104. Most of the fragments of the primitive $404_3$ will fail the depth test, but the fragments of the primitive $404_4$ will pass the depth test, and the fragments of the primitive $404_3$ which passed their depth tests will be hidden by the primitive $404_4$, so the depth values in the TU depth buffer are updated using the depth values of the primitive $404_4$, as shown by the line 702 in FIG. 7(c). The final TU depth buffer values, as shown in FIG. 7(c), when using the DCM_GREATER_EQ mode are therefore very different to those that result when using the DCM_LESS_EQ mode as shown in FIG. 4(c).

There are a number of scenarios for which special consideration is useful, as described below.

For example, a primitive which is present in a tile may have an object type indicating that the depth of the fragments of the primitive cannot be resolved in the tiling unit 104. For example, the primitives may have a punch through object type for which alpha testing is performed later in the graphics processing system 102 (in the texturing/shading unit 108) to determine whether the fragments are included in the primitive. The tiling unit 104 may cull a punch through primitive if it is entirely hidden by previously processed primitives, but the tiling unit 104 does not update the depth values of the TU depth buffer 114 using the depth values of a punch through primitive because the tiling unit 104 cannot be sure whether fragments of the punch through primitive are included in the primitive because the tiling unit 104 does not perform an alpha test for the punch through primitive. As another example of primitives for which depth values cannot be resolved in the tiling unit 104, the primitives may have an object type which indicates that the depth of the fragments can be modified by a shading operation in the texturing/shading unit 108. For a primitive of this type, the tiling unit 104 does not cull the primitive because the tiling unit 104 cannot determine the depth values of the primitive with certainty and because the tiling unit 104 should not cull primitives that could be visible in the image. Therefore, identifiers for these types of primitives are maintained in the tile control stream for the tile. Furthermore, in these cases the depth values of the TU depth buffer are not updated based on the depth values for the primitives to avoid erroneously culling other fragments based on incorrect depth values in the TU depth buffer. The tiling unit 104 might perform depth tests on these primitives and then not act on the results of the depth tests. Alternatively, the tiling unit 104 might simply not perform the depth tests on these types of primitives, such that the tiling unit 104 determines the depth information for a tile without taking into account the fragments of punch through primitives or the fragments of primitives which have shader-modifiable depth values.

Figure 8:
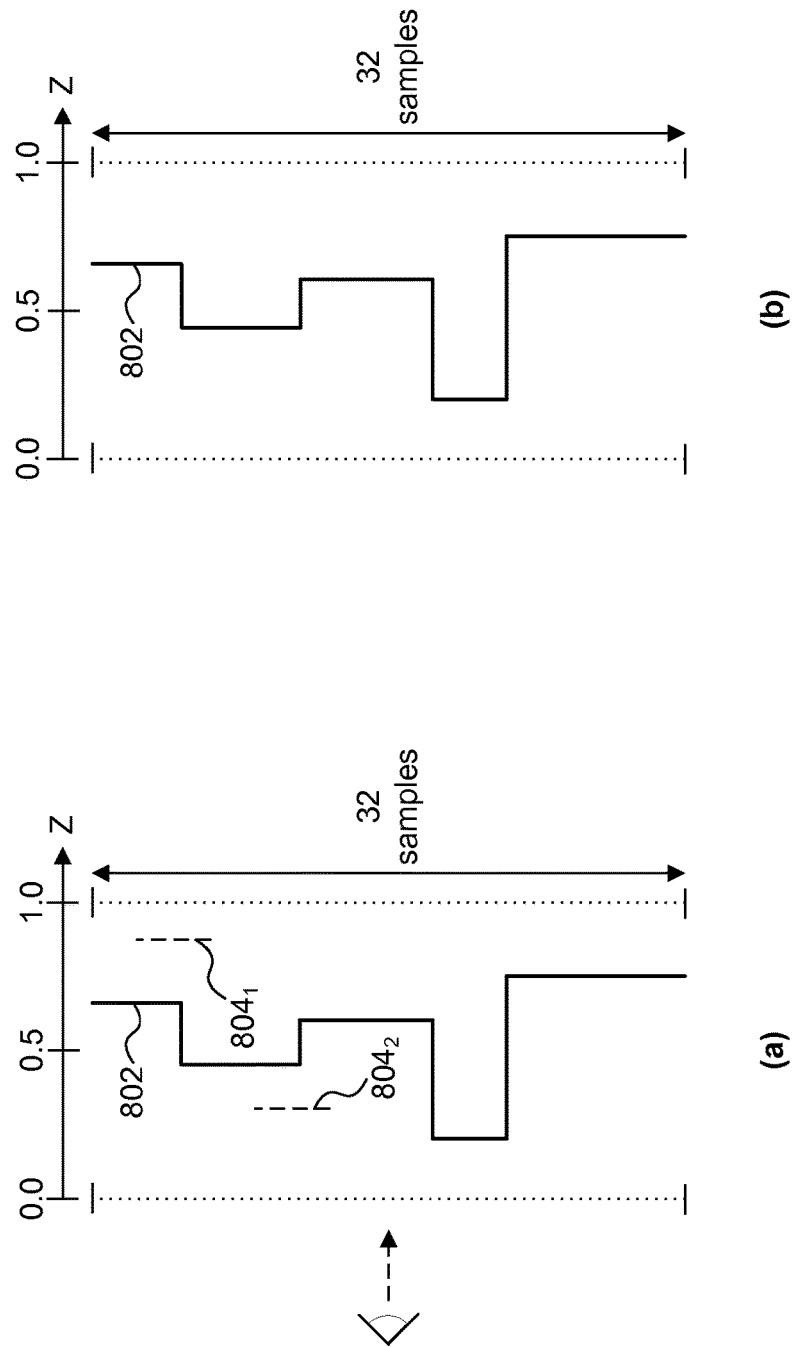
FIG. 8 shows how the tiling unit handles primitives which have depth values that cannot be resolved in the tiling unit.

FIGS. 8(a) and 8(b) illustrate how the tiling unit 104 handles the fragments of primitives for which the depth values cannot be resolved (e.g. fragments with shader-modifiable depth values) in the tiling unit 104. Primitives $804_1$ and $804_2$ have such object types. The line 802 shows the depth values stored in the TU depth buffer for the tile, and it can be seen in FIG. 8(b) that the depth values stored in the TU depth buffer for the tile do not change based on the depths of either of the primitives $804_1$ or $804_2$, even though primitive $804_2$ has a depth value which is lower than the depth values stored in the TU depth buffer for the tile. Furthermore, identifiers for both of the primitives $804_1$ and $804_2$ are included in the tile control stream for the tile, even though the fragments of primitive $804_1$ have depth values which are greater than the depth values stored in the TU depth buffer. It can be appreciated that the behaviour of the tiling unit 104 in this case is conservative in the sense that it will not cause errors in the depth testing although when the depth of a primitive is eventually resolved, it could end up being behind previously processed primitives, in which case a potential opportunity to cull has been missed, or in front of previously processed primitives, in which case a potential opportunity to update the depth buffer has been missed.

This does mean that the depth information passed to the HSR unit 106 might not be completely optimal because it will be missing depth information from the punch through primitives and the primitives for which the tiling unit 104 cannot resolve the depth values. However this should not affect the accuracy of the depth testing performed in the HSR unit 106 unless the depth compare mode has changed direction. The case of a change of direction of the depth compare mode is discussed below. The tiling unit 104 takes a conservative approach so as not to erroneously cull primitives (and so as not to cause the HSR unit 106 to erroneously cull fragments) even if this means that some optimization of the hidden surface removal performed in the HSR unit 106 will be lost.

Another scenario which may need special consideration is if there is a discontinuity in the depth testing performed on the primitives. A discontinuity in the depth testing may occur if for example, a depth clear operation, or a change in the depth compare mode (e.g. a change in direction of the depth compare mode) is received with primitives at the graphics processing system 102. A discontinuity in the depth testing may mean that the final depth values of the TU depth buffer are not optimal in terms of culling the maximum number of fragments in the HSR unit 106 unless special consideration is taken for these cases.

Figure 13:
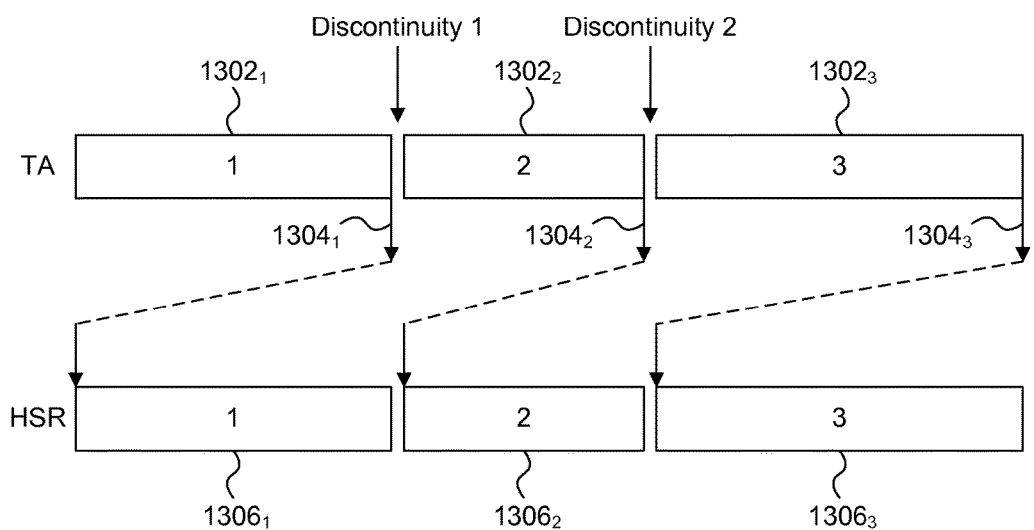
FIG. 13 shows three sequences of primitives in the tiling unit and in the HSR unit.

To handle this, the tiling unit 104 uses the concept of discrete depth records for representing the depth values of the primitives within a tile, wherein each depth record represents the depth values of the TU depth buffer at the end of a particular sequence of primitives for which there is not a discontinuity in the depth testing. In this way, a depth record for a sequence of primitives can be considered to be a snapshot of the state of the TU depth buffer at the end of processing the sequence of primitives. When a discontinuity in the depth testing occurs, a new depth record is started and an identifier is included in the depth information to indicate where in the sequence of primitives the change in depth records occurred. FIG. 13 shows an example in which the tiling unit 104 receives a first sequence of primitives $1302_1$ then there is a discontinuity in the depth testing (e.g. a change in the depth compare mode). The tiling unit 104 then receives a second sequence of primitives 1302₂ then there is another discontinuity in the depth testing (e.g. a depth clear operation). The tiling unit 104 then receives a third sequence of primitives 1302₃. The tiling unit 104 is configured to detect the discontinuities in the depth testing performed on the fragments of the primitives for a tile, and in response to detecting the first discontinuity, the tiling unit 104 will store, e.g. as part of the depth information,: (i) the currently determined depth information (e.g. the current state of the TU depth buffer 114) as a depth record 1304₁ for the tile, and (ii) an identifier of a primitive or primitive block at which the discontinuity is detected (e.g. the sequence ID of the last primitive block for which a given depth record is valid). The tiling unit 104 can then create a new depth record for the tile for depth information of primitives subsequent to the detection of the first discontinuity. The tiling unit performs depth testing on the primitives in the second sequence 1302₂ until it detects the second discontinuity, at which point the current state of the TU depth buffer 114 is stored as a depth record 1304₂ for the tile, and an identifier of the primitive or primitive block at which the second discontinuity is detected is stored. The tiling unit 104 can then start a new depth record and perform depth testing for the third sequence of primitives 1302₃. The end of the third sequence 1302₃ is detected (either as another discontinuity or as the end of the sequence of primitives for the tile), at which point the current state of the TU depth buffer 114 is stored as a depth record 1304₃ for the tile, and an identifier may be stored of the primitive or primitive block at which the sequence 1302₃ ends. The indications of the positions of the ends of the sequences 1302 are used to indicate which primitives belong to which sequences. In other examples, indications of the positions of the starts of the sequences 1302 are used to indicate which primitives belong to which sequences. The depth records 1304 and the indications of the positions of the discontinuities are stored and can be retrieved by the HSR unit 106. In this way, the tiling unit 104 can provide appropriate depth information for the primitives of a tile to the HSR unit 106 even when there is a discontinuity in the depth testing.

The sequences of primitives 1306₁, 1306₂ and 1306₃ are processed by the HSR unit 106 and generally correspond to the respective sequences of primitives 1302₁, 1302₂ and 1302₃ which were processed by the tiling unit 104, although it is possible that the sequences of primitives 1306 do not include all of the primitives included in the corresponding sequences 1302 because the tiling unit 104 may have culled some of the primitives as described above, e.g. if they are completely hidden for a tile. The HSR unit 106 uses the sequence ID of the primitive or primitive block at which the discontinuities are detected to determine which of the depth records to use for performing hidden surface removal on fragments of the primitives for the tile. At the start of each sequence of primitives 1306, the HSR depth buffer 116 (e.g. the coarse HSR depth buffer 606) is initialised using the depth values of the TU depth buffer as indicated by the appropriate depth record 1304. For example, the HSR unit 106 will determine that the depth record 1304₁ is associated with the first sequence of primitives 1306₁ and will load the depth values of the depth record 1304₁ to initialise the depth values in the HSR depth buffer 116 and then perform depth testing on the fragments of the primitives in the sequence 1306₁ using the depth values in the HSR depth buffer 116. The HSR unit 106 determines whether to update (e.g. re-initialise) the HSR depth buffer 116 based on a comparison of the sequence ID of a primitive (or primitive block) which is due to be processed at the HSR unit 106 and the indicated sequence ID of the position of the discontinuity between the sequences 1306₁ and 1306₂. In this way the HSR unit 106 determines when the second sequence of primitives 1306₂ starts and at that point the HSR unit 106 re-initialises the HSR depth buffer 116 using the depth record 1304₂ and then performs depth testing on the fragments of the primitives in the sequence 1306₂ using the depth values in the HSR depth buffer 116. Similarly, the HSR unit 106 will detect the start of the third sequence of primitives 1306₃ using the sequence IDs of the primitives being processed and the sequence ID stored by the tiling unit 104 to indicate the position of the second discontinuity. At this point, the HSR unit 106 re-initialises the HSR depth buffer 116 using the depth record 1304₃ and then performs depth testing on the fragments of the primitives in the sequence 1306₃ using the depth values in the HSR depth buffer 116.

As an example, in which the tiling unit 104 stores the sequence ID of the last primitive block of a particular sequence of primitives 1302, for each new primitive block processed by the HSR unit 106, the HSR unit 106 tests that the sequence ID of the primitive block is less than or equal to the stored sequence ID value associated with the current depth record 1304. If the sequence ID of the current primitive block is greater than the stored sequence ID value, then the depth values for the next depth record 1304 are loaded into the HSR depth buffer 116, and then the HSR unit 106 may check that the new loaded sequence ID of the new depth record is greater than the sequence ID of the current primitive block before processing the primitives from the primitive block. In other examples, the positions of the discontinuities in the sequences of primitives may be indicated in different ways, e.g. by indicating the sequence ID of the first primitive or primitive block of a particular sequence of primitives 1302.

In other examples, the depth information determined by the tiling unit 104 for each of the depth records may be included in the tile control stream itself at the relevant position within the tile control stream. For example, if a particular sequence of primitives 1306ₓ to which a depth record 1304ₓ relates starts at primitive block A and ends at primitive block B then when the tiling unit 104 finishes the depth testing for those primitive blocks of the corresponding sequence of primitives 1302ₓ it can insert the depth information of that particular depth record 1304ₓ into the tile control stream relating to the sequence of primitives 1306ₓ at the position immediately preceding primitive block A. In this case, when the HSR unit 106 reads the tile control stream it will read the depth information from the depth record 1304ₓ for the particular sequence of primitives 1306ₓ at the time that it is needed (i.e. immediately before performing the depth testing on primitives from primitive block A). Therefore, the HSR unit 106 can update the HSR depth buffer 116 using the depth information from the tile control stream, at the time that the HSR unit 106 comes to the depth information in the tile control stream, and this will be appropriate for performing the depth testing in the HSR unit 104 on the fragments of the primitives from primitive block A through to primitive block B. In other examples, the depth information of a particular depth record 1304ₓ may be associated with the appropriate sequence of primitives 1306ₓ identified in the tile control stream in any other suitable manner, as the HSR unit 106 processes the sequence of primitives.

Figure 9:
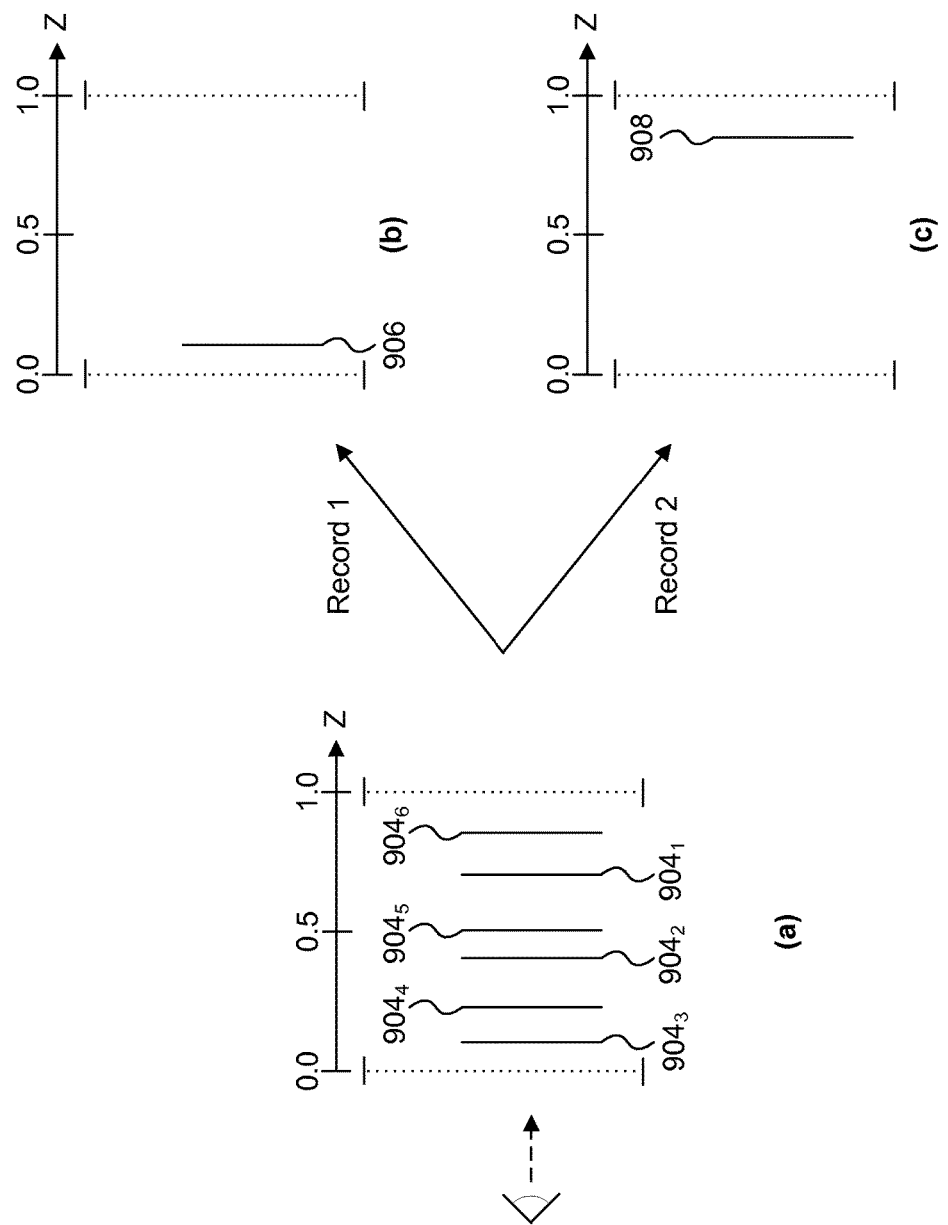
FIG. 9 shows how the tiling unit handles a change in the depth compare mode.

As described above, a detected discontinuity in the depth testing may be caused by a change in direction of the depth compare mode to be used in the depth testing performed by the tiling unit 104. In this case, if only one depth record was used for all of the primitives and if the depth compare mode was firstly DCM_LESS_EQ and later changed to DCM_GREATER_EQ, with geometry sent whilst in both modes, then the final depth values determined in the tiling unit 104 might not be optimal in terms of culling the maximum number of fragments in the HSR unit 106. The use of different depth records for the different compare modes addresses this problem. For example, FIG. 9(a) shows six primitives 904 which all have overlapping fragments within a tile. The primitives are received in order from $904_1$ to $904_6$ and the first three primitives ($904_1$ to $904_3$) are received in the DCM_LESS_EQ mode whereas the last three primitives ($904_4$ to $904_6$) are received in the DCM_GREATER_EQ mode. The depth values in the TU depth buffer at the end of the first sequence of primitives (after primitives $904_1$ to $904_3$ have been processed in the DCM_LESS_EQ mode) represent a first depth record which is shown as line 906 in FIG. 9(b) and this has the depth of the primitive $904_3$. All three primitives $904_1$ to $904_3$ will pass their respective depth tests in the tiling unit 104 and their respective identifiers will be included in the tile control stream.

The depth values of the TU depth buffer 114 for use by the tiling unit 104 in processing the second sequence of primitives (primitives $904_4$ to $904_6$) are initialised using the depth values at the end of the first sequence of primitives (primitives $904_1$ to $904_3$), e.g. which are indicated by the first depth record for the first sequence of primitives. The depth values in the TU depth buffer at the end of the second sequence of primitives (after primitives $904_4$ to $904_6$ have been processed in the DCM_GREATER_EQ mode) represent a second depth record which is shown as line 908 in FIG. 9(c) and this has the depth of the primitive $904_6$. All three primitives $904_4$ to $904_6$ will pass their respective depth tests in the tiling unit 104 and their respective identifiers will be included in the tile control stream. When the HSR unit 106 performs its depth tests on the fragments of the primitives 904, the depth value 906 from the first depth record is loaded into the HSR depth buffer 116 for performing depth tests on the fragments of the primitives $904_1$ to $904_3$, such that the fragments of the primitives $904_1$ and $904_2$ are culled, but the fragments of the primitive $904_3$ pass the depth test in the HSR unit 106. Then the depth value 908 from the second depth record is loaded into the HSR depth buffer 116 for performing depth tests on the fragments of the primitives $904_4$ to $904_6$, such that the fragments of the primitives $904_4$ and $904_5$ are culled, but the fragments of the primitive $904_6$ pass the depth test in the HSR unit 106. It can be seen that this is more efficient (in particular for culling the fragments of the primitives $904_1$ and $904_2$) compared to using a single depth record in which the depth value 908 would be loaded into the HSR depth buffer 116 for performing the depth tests in the HSR unit 106 on all of the fragments of the primitives $904_1$ to $904_6$.

Figure 10:
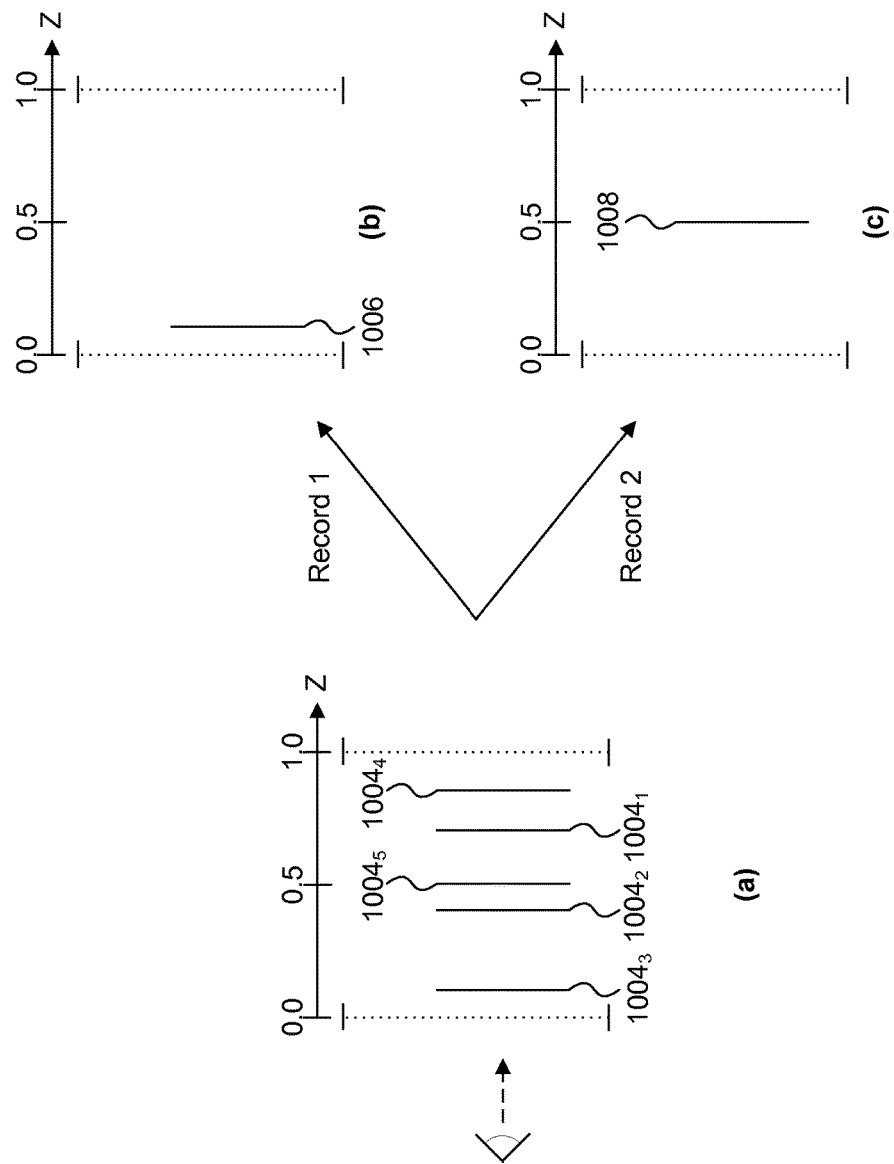
FIG. 10 shows how the tiling unit handles a depth clear operation.

As described above, a detected discontinuity in the depth testing may also be caused by a depth clear operation. For example, FIG. 10(a) shows five primitives 1004 which all have overlapping fragments within a tile and which are received in the DCM_LESS_EQ depth compare mode. The primitives are received in order from $1004_1$ to $1004_5$ and the first three primitives ($1004_1$ to $1004_3$) which form a first sequence of primitives are received before a clear operation and then the last two primitives ($1004_4$ to $1004_5$) which form a second sequence of primitives are received after the clear operation. The depth values in the TU depth buffer 114 at the end of the first sequence of primitives (after primitives $1004_1$ to $1004_3$ have been processed) represent a first depth record which is shown as line 1006 in FIG. 10(b) and this has the depth of the primitive $1004_3$. All three primitives $1004_1$ to $1004_3$ will pass their respective depth tests in the tiling unit 104 and their respective identifiers will be included in the tile control stream.

The depth values of the TU depth buffer 114 for use by the tiling unit 104 in processing the second sequence of primitives (primitives $904_4$ to $904_6$) are initialised using clear values, e.g. depths of 1.0 when operating in the DCM_LESS_EQ mode. In this way, the second sequence of primitives is processed using a TU depth buffer 114 which initially has a clear state. The depth values in the TU depth buffer at the end of the second sequence of primitives (after primitives $1004_4$ and $1004_5$ have been processed) represent a second depth record which is shown as line 1008 in FIG. 10(c) and this has the depth of the primitive $1004_5$. Both primitives $1004_4$ and $1004_5$ will pass their respective depth tests in the tiling unit 104 and their respective identifiers will be included in the tile control stream. When the HSR unit 106 performs its depth tests on the fragments of the primitives 1004, the depth value 1006 is loaded into the HSR depth buffer 116 for performing depth tests on the fragments of the primitives $1004_1$ to $1004_3$, such that the fragments of the primitives $1004_1$ and $1004_2$ are culled, but the fragments of the primitive $1004_3$ pass the depth test in the HSR unit 106. Then the depth value 1008 is loaded into the HSR depth buffer 116 for performing depth tests on the fragments of the primitives $1004_4$ and $1004_5$, such that the fragments of the primitive $1004_4$ is culled, but the fragments of the primitive $1004_5$ pass the depth test in the HSR unit 106. It can be seen that this is more efficient (in particular for culling fragments of primitive $1004_1$) compared to using a single depth record in which the depth value 1008 would be loaded into the HSR depth buffer 116 for performing the depth tests in the HSR unit 106 on the fragments of all of the primitives $1004_1$ to $1004_5$.

The situation can become more complicated if one or more of the primitives in a tile has an object type indicating that the depth of the fragments of the primitives cannot be resolved in the tiling unit 104. In this case, if there is a change in depth compare mode, the TU depth buffer 114 for a new sequence of primitives cannot be initialised using the final depth values of the previous sequence of primitives, because the final values of the previous sequence of primitives might not be valid due to the tiling unit 104 being unable to resolve the depth of at least one of the fragments in the tile. Therefore, in this case, the tiling unit 104 initialises the TU depth buffer for the new sequence of primitives such that the depth values in the TU depth buffer at sample positions covered by the primitive with the unresolved depth are set to the most conservative values of the new depth compare mode. The "most conservative values" are the values which would be least likely to pass the depth tests in the new depth compare mode. For example, in the DCM_LESS_EQ mode, the most conservative value is 1.0; whilst in the DCM_GREATER_EQ mode, the most conservative value is 0.0. For some depth compare modes (e.g. DCM_EQUAL, DCM_NOT_EQUAL, DCM_NEVER and DCM_ALWAYS) there might not be values which are the "most conservative". When the depth compare mode changes to one of these depth compare modes, the tiling unit 104 may simply initialise the TU depth buffer for the new sequence of primitives using the current depth values in the TU depth buffer.

Figure 11:
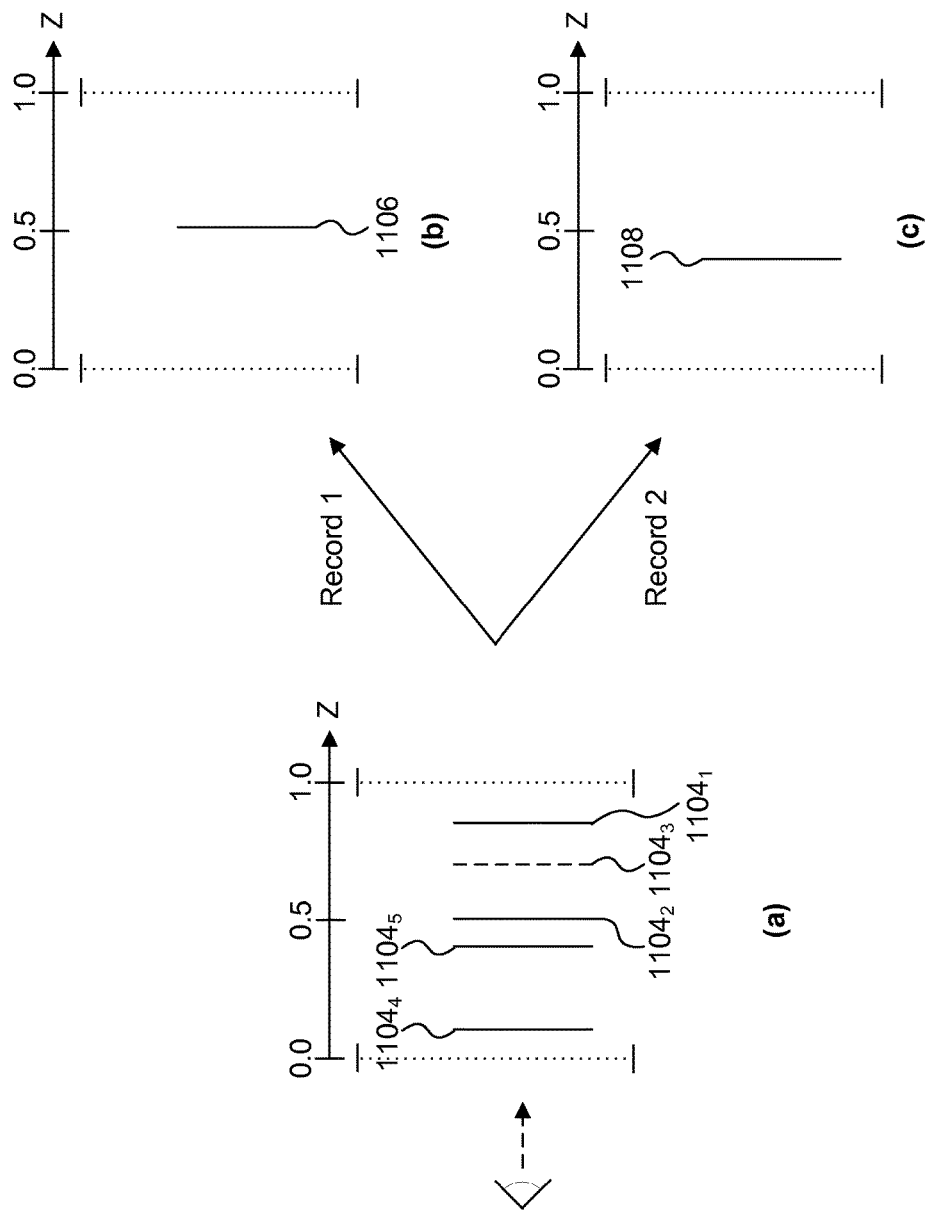
FIG. 11 shows how the tiling unit handles a change in the depth compare mode when at least one primitive has depth values that cannot be resolved in the tiling unit.

FIG. 11 shows an example of the situation mentioned in the previous paragraph. That is, FIG. 11(a) shows five primitives 1104 which all have overlapping fragments within a tile. The primitives are received in order from $1104_1$ to $1104_5$ and the first three primitives ($1104_1$ to $1104_3$) form a first sequence of primitives and are received in the DCM_LESS_EQ mode whereas the last two primitives ($1104_4$ and $1104_5$) form a second sequence of primitives and are received in the DCM_GREATER_EQ mode. The tiling unit 104 can resolve the depths of the primitives $1104_1$, $1104_2$, $1104_4$ and $1104_5$ but not the depth of the primitive $1104_3$. That is, the primitive $1104_3$ has an object type indicating that the depth of the fragments of the primitive $1104_3$ cannot be resolved in the tiling unit 104. The depth values in the TU depth buffer at the end of the first sequence of primitives (after primitives $1104_1$ to $1104_3$ have been processed in the DCM_LESS_EQ mode) represent a first depth record and are shown as line 1106 in FIG. 11(b) and this has the depth of the primitive $1104_2$. Primitives $1104_1$ and $1104_2$ will pass their respective depth tests in the tiling unit 104 and their respective identifiers will be included in the tile control stream. Since the depth value of the primitive $1104_3$ cannot be resolved in the tiling unit 104, to be conservative the identifier for the primitive $1104_3$ will be included in the tile control stream. Furthermore, since the depth value of the primitive $1104_3$ cannot be resolved in the tiling unit 104, in order to be conservative for the new depth compare mode of the new sequence of primitives, the depth values in the TU depth buffer for the second sequence of primitives are initialised using the most conservative depth value in the DCM_GREATER_EQ mode which is to be used for processing the second sequence of primitives, which is a depth value of 0.0. Therefore, primitives $1104_4$ and $1104_5$ (which would have failed a depth test again any of primitives $1104_1$ to $1104_3$) will pass their respective depth tests in the tiling unit 104 and their respective identifiers will be included in the tile control stream. The depth values in the TU depth buffer at the end of the second sequence of primitives (after primitives $1104_4$ and $1104_5$ have been processed in the DCM_GREATER_EQ mode) represent a second depth record and are shown as line 1108 in FIG. 9(c) and this has the depth of the primitive $1104_5$. When the HSR unit 106 performs its depth tests on the primitives 1104, the depth value 1106 is loaded into the HSR depth buffer 116 for performing depth tests on primitives $1104_1$ to $1104_3$. This will allow the HSR unit 106 to cull fragments of primitive $1104_1$, whilst the fragments of the primitive $1104_2$ will pass their depth tests. The fragments of the primitive $1104_3$ will need to be resolved first in the texturing/shading unit 108 and then depth tested in the HSR unit 106. Then the depth value 1108 is loaded into the HSR depth buffer 116 for performing depth tests on primitives $1104_4$ and $1104_5$. This will allow the HSR unit 106 to cull fragments of primitive $1104_4$, whilst the fragments of the primitive $1104_5$ will pass their depth tests.

When the HSR unit 106 initialises the HSR depth buffer 116 for a new sequence of primitives in the examples described above, the current depth values in the HSR depth buffer 116 may simply be overwritten by the depth values for the new sequence of primitives, as indicated by the depth record for the new sequence of primitives. However, the situation can become more complicated if at least one of the primitives in a tile has an object type indicating that the depth of the fragments of the primitives cannot be resolved in the tiling unit 104. To ensure that the HSR unit 106 correctly performs hidden surface removal, it is ensured that the values in the HSR depth buffer 116 are valid at all times. Therefore if the tiling unit 104 has not been able to resolve the depths of some primitives, the HSR unit 106 does not completely overwrite the depth values in the HSR depth buffer 116 with the TU depth values for a new sequence of primitives based on the appropriate depth record for the new sequence of primitives. The same is true if the resolution of the TU depth buffer is not the same as the resolution of the HSR depth buffer which is being updated. In these cases, the HSR depth buffer 116 may be updated by merging the depth values of the depth record relating to the new sequence of primitives with the values already in the HSR depth buffer 116. The merging uses the current depth compare mode to produce the optimal result. For example, depending on the depth compare mode, the maximum or minimum of: (i) the HSR depth buffer 116, and (ii) the forwarded TU depth buffer for each fragment position is selected and stored in the HSR depth buffer 116. For example, if the new depth compare mode is DCM_LESS_EQ then for each fragment position, the lower of the value stored in the HSR depth buffer 116 and the corresponding value in the forwarded TU depth buffer is selected and stored in the HSR depth buffer 116. In contrast, continuing with this example, if the new depth compare mode is DCM_GREATER_EQ then for each fragment position, the higher of the value stored in the HSR depth buffer 116 and the corresponding value in the forwarded TU depth buffer is selected and stored in the HSR depth buffer 116.

In most cases, the primitive which should eventually be rendered in front at any particular sample position is the same primitive that established the forwarded depth value at that position. So, a fragment needs to be able to pass a depth test against itself. This works naturally with the DCM_LESS_EQ and the DCM_GREATER_EQ compare modes described above. However, it can be appreciated that if the new depth compare mode following a change in depth compare mode is DCM_LESS (rather than DCM_LESS_EQ as described in examples above) then when the HSR depth buffer 116 is updated using the forwarded depth values, the depth values in the HSR depth buffer 116 may be updated to be a small amount (e.g. one unit of least precision (ulp)) greater than the corresponding forwarded depth values from the tiling unit 104. This is because the forwarded depth values will show the lowest depth values for each fragment position within a particular depth stream. The primitive(s) which have the fragments at the lowest depth values should pass the depth test in the HSR unit 106, but they will have depth values that are equal to those in the forwarded depth information. Similarly, if the new depth compare mode following a change in depth compare mode is DCM_GREATER (rather than DCM_GREATER_EQ as in examples described above) then when the HSR depth buffer 116 is updated using the forwarded depth values, the depth values in the HSR depth buffer 116 may be updated to be a small amount (e.g. one unit of least precision (ulp)) less than the corresponding forward depth values from the tiling unit 104. This is because the forwarded depth values will show the highest depth values for each fragment position within a particular depth stream. The primitive(s) which have the fragments at the highest depth values should pass the depth test in the HSR unit 106, but they will have depth values that are equal to those in the forwarded depth information.

It can be seen in the examples described above that by enabling the tiling unit 104 to perform depth tests and forward depth information for tiles to the HSR unit 106, the efficiency of the hidden surface removal in the HSR unit 106 can be improved. In particular, in the case of a translucent or punch through fragment subsequently being hidden by an opaque fragment, the depth information forwarded from the tiling unit 104 allows the HSR unit 106 to cull the translucent or punch through fragment without performing any unnecessary flushing or blending operations on the translucent or punch through fragment.

It is noted that FIG. 1 shows the different functional units of the graphics processing system 102 as separate blocks, arranged in the order: tiling unit 104, HSR unit 106 and then texturing/shading unit 108, because the graphics processing system 102 shown in FIG. 1 is a tile-based deferred rendering system such that tiling calculations are performed, then HSR is applied to fragments of primitives before the fragments are textured and/or shaded. Although the units are shown as separate functional units in FIG. 1, the different functions of different units may be performed by the same physical block. For example, the same hardware block may be configured to implement both the tiling unit 104 and the texturing/shading unit 108, but it makes sense functionally to show the units in the order shown in FIG. 1 since this represents the order in which the different processes are performed on the fragments of the primitives.

In the examples described above, an initial depth test is performed in the tiling unit 104 and the depth information determined by the tiling unit 104 is forwarded to the HSR unit 106 so that when the HSR unit 106 performs hidden surface removal it can use the forwarded depth information, e.g. to set the values in the HSR depth buffer 116. In other examples, the initial depth test may be performed in a processing unit other than the tiling unit 104. In this way, the principles of the examples described above can be used in graphics processing systems which are not tile-based. For example, in general, a graphics processing system may be configured to process primitives which are present in a rendering space of the system. In general, the system includes a first processing unit which can be configured to process the primitives prior to hidden surface removal. In the examples described above, the first processing unit is the tiling unit 104. The system also includes a hidden surface removal unit which is configured as described above to perform hidden surface removal on fragments of the primitives at sample positions of the rendering space. The first processing unit can be further configured to determine depth information for the primitives by performing depth tests on fragments of the primitives, and to forward the determined depth information for use by the hidden surface removal unit. The hidden surface removal unit can then use the forwarded depth information in performing said hidden surface removal. As an alternative example, the first processing unit may be a vertex shader configured to perform vertex shading on incoming primitive data. A vertex shader is often arranged to process primitive data before a HSR unit, and the vertex shader uses primitive coordinates (e.g. including depth values) to perform the vertex shading, so this is a good place to determine depth information for the primitives before hidden surface removal is performed. A vertex shader could forward the depth information for use by the HSR unit in a similar manner to that described above in the examples in which the depth information is forwarded by the tiling unit for use by the HSR unit. An advantage of implementing the depth testing in a tiled system (e.g. in a tiling unit) is that, at a given time, the tiling unit is usually processing data for a later frame than the frame for which the HSR unit is processing data, e.g. the tiling unit might be processing data for the frame immediately following the frame for which the HSR unit is processing data. This frame delay between the first processing unit (e.g. tiling unit) and the HSR unit can be exploited as described herein to determine the depth information for a frame before the HSR unit processes the frame without adding too much extra delay into the system. If the first processing unit was implemented in a non-tile based graphics processing system then a delay would be added for the first processing unit to determine the depth information. This delay may be detrimental in some implementations. Without discontinuities in the depth testing for a frame (e.g. if there are no DCM changes or depth clear operations), then the delay would be sufficient for the first processing unit to process all of the primitive data for a frame before the HSR unit starts to process the primitive data for that frame. However, if there are discontinuities in the depth testing for a frame (e.g. if there are DCM changes or depth clear operations), then the delay would be sufficient for the first processing unit to process all of the primitive data for the next sequence of primitives (i.e. up to the next discontinuity) before the HSR unit starts to process the primitive data for that sequence of primitives. So if there are many discontinuities in the depth testing then the detrimental effect of the extra delay due to implementing the depth testing in the first processing unit in a non tile-based graphics processing system are reduced.

Generally, any of the functions, methods, techniques or components described above can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, block, unit, component or logic represents program code that performs specified tasks when executed on a processor (e.g. one or more CPUs). In one example, the methods described may be performed by a computer configured with software in machine readable form stored on a non-transitory computer-readable medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising non-transitory computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, unit, block, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit, block or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, block, unit, component or logic described above, such as HDL (hardware description language) software, as is used for designing integrated circuits, or for configuring programmable chips, to carry out desired functions. That is, there may be provided a computer readable storage medium having encoded thereon computer readable program code for generating a graphics processing system configured to perform any of the methods described herein, or for generating a graphics processing system comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a graphics processing system as described herein. To put it another way, there may be provided a non-transitory computer readable storage medium having stored thereon computer readable instructions that, when processed at a computer system for generating a manifestation of an integrated circuit, cause the computer system to generate a manifestation of a graphics processing system according to any of the examples described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A graphics processing system having a rendering space sub-divided into a plurality of tiles, the system being configured to process primitives which are present in one or more of the tiles, the system comprising:

a tiling unit configured to process the primitives to: (i) determine, for each of the primitives, which of the tiles the primitive is present in, and (ii) generate tile control streams for the tiles, wherein the tile control stream for a tile includes indicators of primitives which are present in that tile; and a hidden surface removal unit configured to: (i) retrieve data relating to the primitives which are present in a tile as indicated by the generated tile control stream for that tile, and (ii) perform hidden surface removal on fragments of the indicated primitives at sample positions of that tile;

wherein the tiling unit is further configured to:
determine depth information for the tiles by performing depth tests on fragments of the primitives as the primitives are processed in the tiling unit; and
make the determined depth information available for use by the hidden surface removal unit; and wherein the hidden surface removal unit is configured to use the determined depth information in performing said hidden surface removal.

2. The graphics processing system of claim 1 wherein the hidden surface removal unit is configured to use the determined depth information for a tile in setting values of a HSR depth buffer for use in performing said hidden surface removal for that tile.

3. The graphics processing system of claim 1 wherein the tiling unit is configured to determine the depth information for a tile based on a tiling unit depth buffer which indicates depth values at sample positions of that tile, and which is maintained by the tiling unit.

4. The graphics processing system of claim 3 wherein in order to determine the depth information for a tile, the tiling unit is configured to, for a fragment of a primitive that is present in that tile;
determine whether the fragment passes the depth test by comparing a depth value of the fragment to a depth value in the tiling unit depth buffer at a corresponding sample position of that tile in accordance with a depth compare mode; and
if the fragment passes the depth test and if it is appropriate for the primitive and the depth compare mode, update the depth value in the tiling unit depth buffer at the corresponding sample position of that tile.

5. The graphics processing system of claim 4 wherein the tiling unit is configured to make available the depth information for that tile when the tiling unit has finished processing the fragments of primitives that are present in that tile.

6. The graphics processing system of claim 4 wherein the tiling unit is configured to include an indicator of a primitive in the tile control stream for a tile only if the primitive includes at least one fragment which passes the depth test and which is present in that tile.

7. The graphics processing system of claim 3 wherein the determined depth information comprises values of a coarse depth buffer, wherein each value of the coarse depth buffer represents a block of values within the tiling unit depth buffer, and wherein the tiling unit is configured to determine the values of the coarse depth buffer in a conservative manner based on the corresponding blocks of values within the tiling unit depth buffer.

8. The graphics processing system of claim 1 wherein the hidden surface removal unit comprises:
a hierarchical depth testing module configured to perform an initial hidden surface removal stage at a coarse scale which does not include per-sample depth tests; and a per-sample depth testing module configured to perform a subsequent hidden surface removal stage at the sample scale and which does include per-sample depth tests.

9. The graphics processing system of claim 8 wherein the determined depth information comprises values of a coarse depth buffer, wherein each value of the coarse depth buffer represents a block of values within the tiling unit depth buffer, and wherein the tiling unit is configured to determine the values of the coarse depth buffer in a conservative manner based on the corresponding blocks of values within the tiling unit depth buffer, and wherein the values of the coarse depth buffer are at the same coarse scale of the initial hidden surface removal stage, and wherein the values of the coarse depth buffer are used by the hierarchical depth testing module to perform said initial hidden surface removal.

10. The graphics processing system of claim 1 wherein the tiling unit is configured such that if a primitive which is present in a tile has an object type indicating that the depth of the fragments of the primitive cannot be resolved in the tiling unit then the fragments of that primitive are maintained in the tile control stream for that tile and the depth information is determined for that tile without taking the fragments of the primitive into account.

11. The graphics processing system of claim 1 wherein the tiling unit is configured to:
  detect a discontinuity in the depth testing performed on the fragments of the primitives for a tile;
  in response to detecting the discontinuity, store: (i) the currently determined depth information as a particular depth record for that tile, and (ii) an identifier of a primitive or primitive block at which the discontinuity is detected; and
  create a new depth record for that tile for depth information of primitives subsequent to the detection of the discontinuity.

12. The graphics processing system of claim 11 wherein the hidden surface removal unit is configured to use the identifier of the primitive or primitive block at which the discontinuity is detected to determine which of the depth records to use for performing hidden surface removal on the fragments of the primitives for that tile.

13. The graphics processing system of claim 12 wherein the hidden surface removal unit is configured to use the forwarded depth information for a tile in setting depth values of a HSR depth buffer for use in performing said hidden surface removal for that tile, and wherein each of the depth records represents depth values of a tiling unit depth buffer at the end of a sequence of primitives for which there is not a discontinuity in the depth testing, and wherein the hidden surface removal unit is configured to:
  determine whether to update the HSR depth buffer based on a comparison of the identifier of the primitive or primitive block at which the discontinuity is detected and an identifier of a primitive or primitive block which is due to be processed at the hidden surface removal unit; and
  in dependence on the result of said comparison, update the HSR depth buffer using depth values of the new depth record.

14. The graphics processing system of claim 13 wherein the hidden surface removal unit is configured to use the forwarded depth information of the particular depth record to set values of the HSR depth buffer by merging depth values of the particular depth record with the depth values of the HSR depth buffer.

15. The graphics processing system of claim 11 wherein the detected discontinuity in the depth testing is caused by a depth clear operation and wherein the tiling unit depth buffer is set to have a clear state before performing depth tests on primitives subsequent to the detected discontinuity.

16. The graphics processing system of claim 11 wherein the detected discontinuity in the depth testing is caused by a change in a depth compare mode to be used in the depth testing performed by the tiling unit.

17. The graphics processing system of claim 1 wherein the tiling unit is configured to:
  detect a discontinuity in the depth testing performed on the fragments of the primitives for a tile;
  in response to detecting the discontinuity, include the currently determined depth information as a particular depth record for that tile in the tile control stream at a position corresponding to the start of a particular sequence of primitives to which the particular depth record relates; and
  create a new depth record for that tile for depth information of primitives subsequent to the detection of the discontinuity.

18. A method of processing primitives in a graphics processing system having a rendering space sub-divided into a plurality of tiles, the method comprising:
  processing the primitives at a tiling unit to: (i) determine, for each of the primitives, which of the tiles the primitive is present in, and (ii) generate tile control streams for the tiles, wherein the tile control stream for a tile includes indicators of primitives which are present in that tile; and
  processing the primitives at a hidden surface removal unit by: (i) retrieving data relating to the primitives which are present in a tile as indicated by the generated tile control stream for that tile, and (ii) performing hidden surface removal on fragments of the indicated primitives at sample positions of that tile;
  wherein the method further comprises:
    determining depth information for the tiles at the tiling unit by performing depth tests on fragments of the primitives as the primitives are processed in the tiling unit;
    making available the determined depth information from the tiling unit for use by the hidden surface removal unit; and
  using the determined depth information in performing said hidden surface removal at the hidden surface removal unit.

19. A graphics processing system configured to process primitives which are present in a rendering space of the system, the system comprising:
  a first processing unit configured to process the primitives prior to hidden surface removal; and
  a hidden surface removal unit configured to perform hidden surface removal on fragments of the primitives at sample positions of the rendering space;
  wherein the first processing unit is further configured to:
    determine depth information for the primitives by performing depth tests on fragments of the primitives; and
    make available the determined depth information for use by the hidden surface removal unit; and
  wherein the hidden surface removal unit is configured to use the forwarded depth information in performing said hidden surface removal.

20. A non-transitory computer readable storage medium having stored thereon computer readable code that, when processed at a computer system for generating a manifestation of an integrated circuit, causes the computer system to generate a manifestation of a graphics processing system comprising:
- a tiling unit configured to process primitives which are present in one or more tiles of a plurality of tiles of a rendering space of the graphics processing system, to: (i) determine, for each of the primitives, which of the tiles the primitive is present in, and (ii) generate tile control streams for the tiles, wherein the tile control stream for a tile includes indicators of primitives which are present in that tile; and
- a hidden surface removal unit configured to: (i) retrieve data relating to the primitives which are present in a tile as indicated by the generated tile control stream for that tile, and (ii) perform hidden surface removal on fragments of the indicated primitives at sample positions of that tile;
- wherein the tiling unit is further configured to:
  - determine depth information for the tiles by performing depth tests on fragments of the primitives as the primitives are processed in the tiling unit; and
  - make available the determined depth information for use by the hidden surface removal unit; and
- wherein the hidden surface removal unit is configured to use the determined depth information in performing said hidden surface removal.

\* \* \* \* \*